(12) United States Patent
Lewin et al.

(10) Patent No.: US 11,146,534 B1
(45) Date of Patent: Oct. 12, 2021

(54) IMPLEMENTING A CLIENT-SIDE POLICY ON CLIENT-SIDE LOGIC

(71) Applicant: Microsoft Technology Licensing, LLC, Redmond, WA (US)

(72) Inventors: Guy Lewin, New York City, NY (US); Yossef Haber, Gannei Tikva (IL); Vitaly Khait, Yavne (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/842,485

(22) Filed: Apr. 7, 2020

(51) Int. Cl.
| | |
|---|---|
| *H04L 29/06* | (2006.01) |
| *H04L 29/08* | (2006.01) |
| *G06F 9/455* | (2018.01) |

(52) U.S. Cl.
CPC ...... *H04L 63/0281* (2013.01); *G06F 9/45529* (2013.01); *H04L 63/0428* (2013.01); *H04L 63/20* (2013.01); *H04L 67/02* (2013.01)

(58) Field of Classification Search
CPC ......... G06F 9/45529; G06F 9/95; H04L 67/02
See application file for complete search history.

(56) References Cited

U.S. PATENT DOCUMENTS

| | | | | |
|---|---|---|---|---|
| 5,973,696 A * | 10/1999 | Agranat | ..................... | G06F 8/34 715/760 |
| 6,073,241 A * | 6/2000 | Rosenberg | .............. | H04L 29/06 726/3 |
| 7,509,584 B2 * | 3/2009 | Moser | ....................... | G06F 8/38 704/3 |
| 8,079,025 B2 * | 12/2011 | Marchant | ............ | G06F 9/44521 717/166 |
| 8,868,533 B2 * | 10/2014 | Powell | ................... | H04L 67/142 707/705 |
| 8,954,989 B1 | 2/2015 | Colton et al. | | |
| 9,009,810 B2 * | 4/2015 | Grigoriev | ............. | H04L 63/102 726/12 |
| 9,407,727 B1 * | 8/2016 | McCanne | ............... | H04L 67/34 |
| 2009/0049183 A1 * | 2/2009 | Thompson | .............. | G06F 21/41 709/229 |

(Continued)

FOREIGN PATENT DOCUMENTS

EP 3413192 A1 12/2018

OTHER PUBLICATIONS

"International Search Report & Written Opinion Issued in PCT Application No. PCT/US21/018081", dated Apr. 14, 2021, 13 Pages.

*Primary Examiner* — Lashonda T Jacobs
(74) *Attorney, Agent, or Firm* — Wade IP Law PLLC

(57) ABSTRACT

Techniques are described herein that are capable of implementing a client-side policy on client-side logic. The client-side policy is configured to support client-side hooks by configuring a rule in the client-side policy to be applied to the client-side logic, which is configured to be executed in a browser of a client device in a network-based system. The rule indicates an administrator-defined action to be performed in response to a request to execute the client-side logic. The administrator-defined action is defined by an administrator of the network-based system. The request to execute the client-side logic in the browser is received. The administrator-defined action is performed based at least in part on the rule in the client-side policy in response to receipt of the request.

20 Claims, 10 Drawing Sheets

(56) References Cited

U.S. PATENT DOCUMENTS

| | | | |
|---|---|---|---|
| 2013/0290858 A1* | 10/2013 | Beveridge | G06F 16/957 715/740 |
| 2014/0181639 A1* | 6/2014 | Lund | G06F 3/04883 715/234 |
| 2016/0050218 A1* | 2/2016 | Chen | H04N 21/8166 726/4 |
| 2017/0346909 A1* | 11/2017 | Hou | H04L 67/22 |
| 2020/0412697 A1* | 12/2020 | Lewin | H04L 67/2819 |

* cited by examiner

IMPLEMENTING A CLIENT-SIDE POLICY ON CLIENT-SIDE LOGIC

BACKGROUND

A proxy server is a computing device that serves as an intermediary between a client device (e.g., a browser thereon) and a web server to intercept requests initiated by the client device that request resources from the web server. The proxy server typically analyzes and/or modifies a resource before passing on the requested or modified resource to the client device.

One example of a resource is a web page. A web page includes multiple elements. One example of an element that may be included in a web page is an ECMAScript object. An ECMAScript object is an object that conforms to the ECMAScript standard, which is a scripting-language specification developed and maintained by Ecma International in ECMA-262 and ISO/IEC 16262. Example implementations of ECMAScript include but are not limited to JavaScript®, Jscript®, and ActionScript®.

Policies may be defined and enforced by the proxy server to control users' behavior with regard to the resources; detect risky behavior, violations, and suspicious data points and activities regarding the resources; and integrate remediation work flows to mitigate risks. For instance, the proxy server may modify the resources (e.g., ECMAScript objects therein) that are processed at the web server based on the policies. However, such policies traditionally apply to server-side logic (e.g., ECMAScript objects that are processed by the web server) and are generically applied across all resources.

SUMMARY

Various approaches are described herein for, among other things, implementing a client-side policy on client-side logic. A client-side policy provides rules to be applied to client-side logic. For instance, the rules may indicate (e.g., specify) actions that are to be performed with regard to (e.g., on) client-side logic that has one or more specified attributes. Examples of an attribute include but are not limited to a name, an association with a user or a group of users, and a functionality. Client-side logic is logic that is configured to be executed by a browser (e.g., web browser); whereas, server-side logic is logic that is configured to be executed by a web server. Examples of client-side logic include but are not limited to an ECMAScript object (e.g., an ECMAScript function), a Hypertext Markup Language (HTML) tag or heading, and a Cascading Style Sheets (CSS) style sheet declaration block that are configured to be executed by a browser. In accordance with the approaches described herein, the client-side policy is configured to support client-side hooks. A hook is one or more lines of code that are inserted into a web page (e.g., in a script embedded therein) to wrap logic (e.g., an object) therein, to change behavior of the web page, and/or to react in response to (e.g., based on) occurrence of an event. A client-side hook is a hook that is inserted into code of the web page that is to be executed by the browser. One example type of a hook is a wrapper. For instance, hooking client-side logic may include wrapping the client-side logic in a wrapper.

In an example approach, a client-side policy is configured to support client-side hooks by configuring a rule in the client-side policy to be applied to designated client-side logic that is configured to be executed in a browser of a client device in a network-based system. The rule indicates an administrator-defined action to be performed in response to a request to execute the designated client-side logic. The administrator-defined action is defined by an administrator of the network-based system. The request to execute the designated client-side logic in the browser is received. The administrator-defined action is performed based at least in part on the rule in the client-side policy in response to receipt of the request. The administrator-defined action may include (a) executing the designated client-side logic, (b) triggering an error, or (c) executing administrator-defined client-side logic, which is a proxy of the designated client-side logic and which is defined by the administrator of the network-based system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 3:
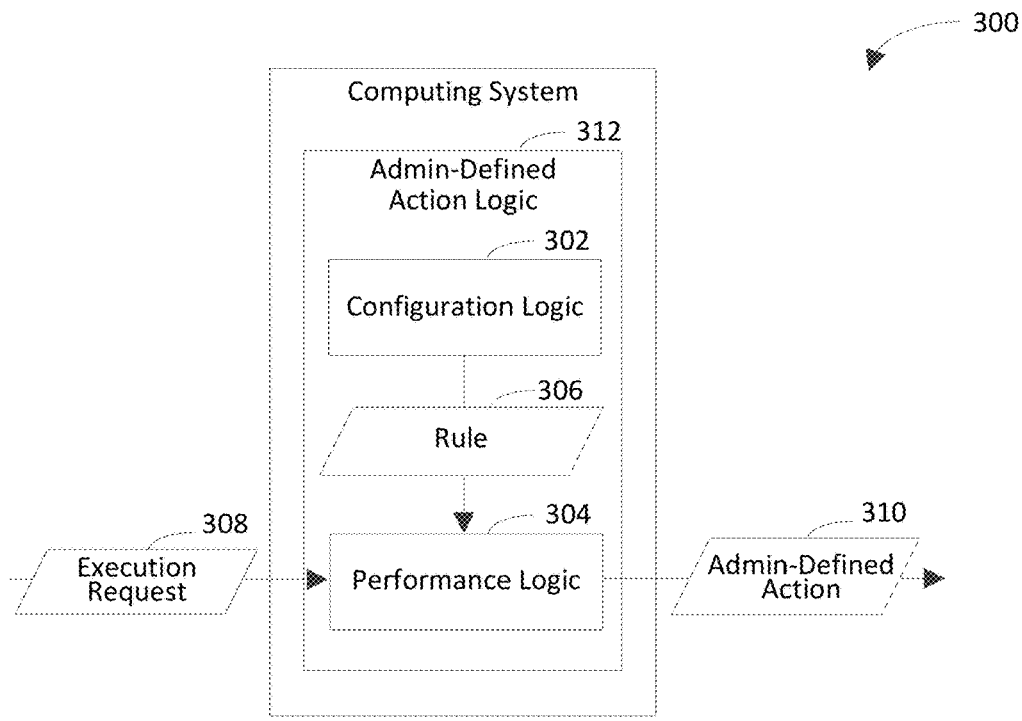
Figure 5:
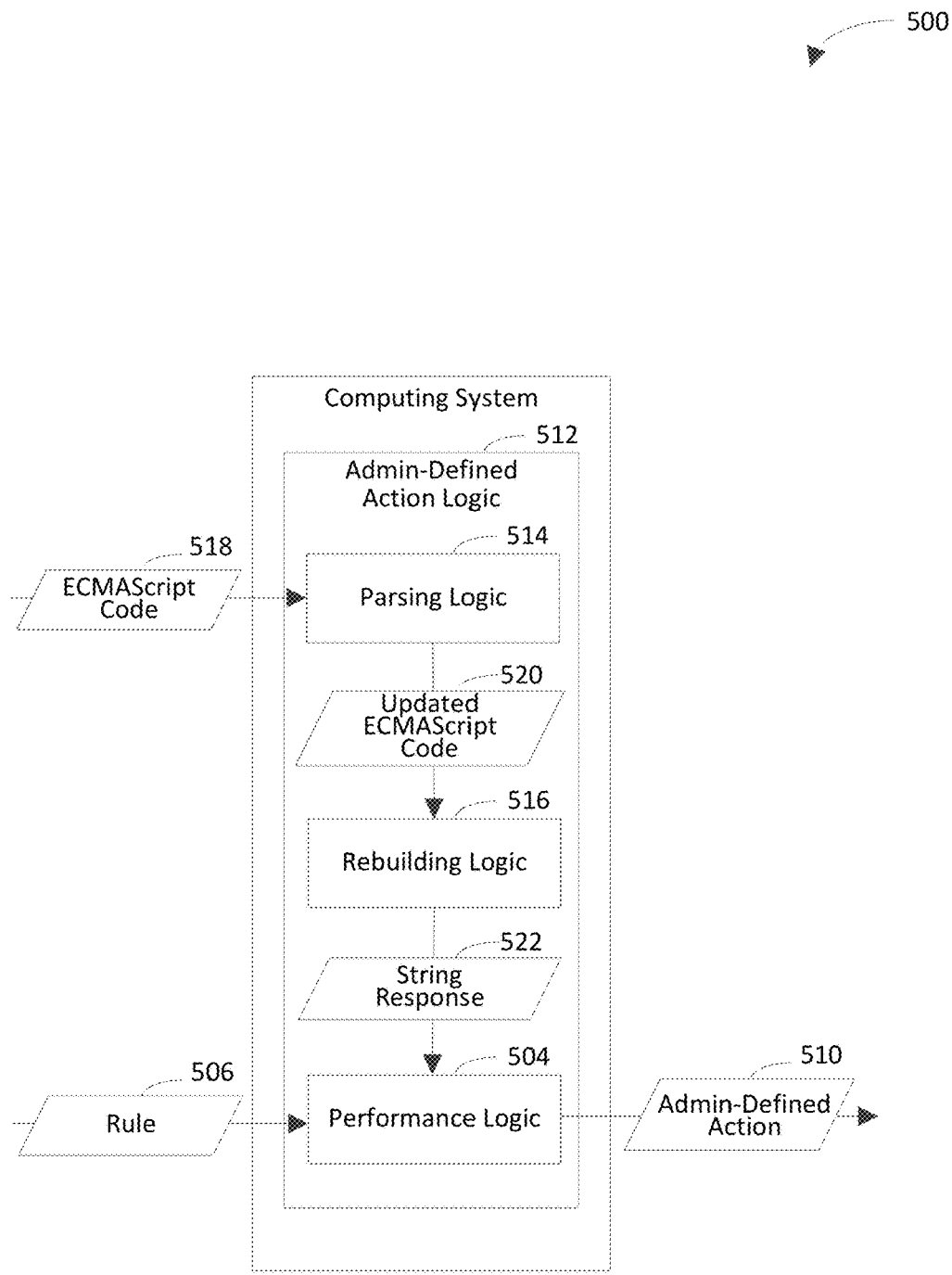
Figure 8:
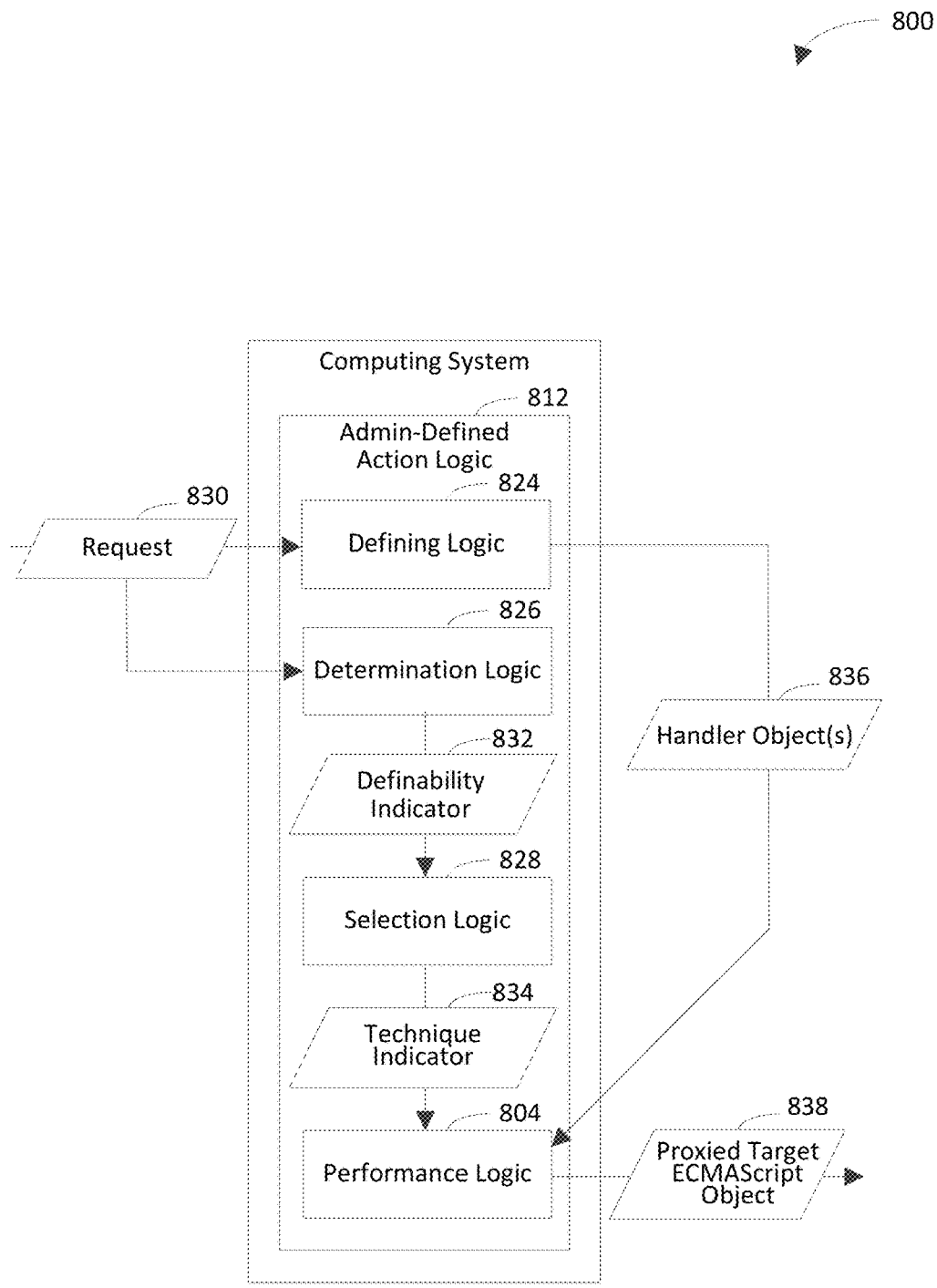

FIGS. 3, 5, and 8 are block diagrams of example computing systems in accordance with embodiments.

Figure 4:
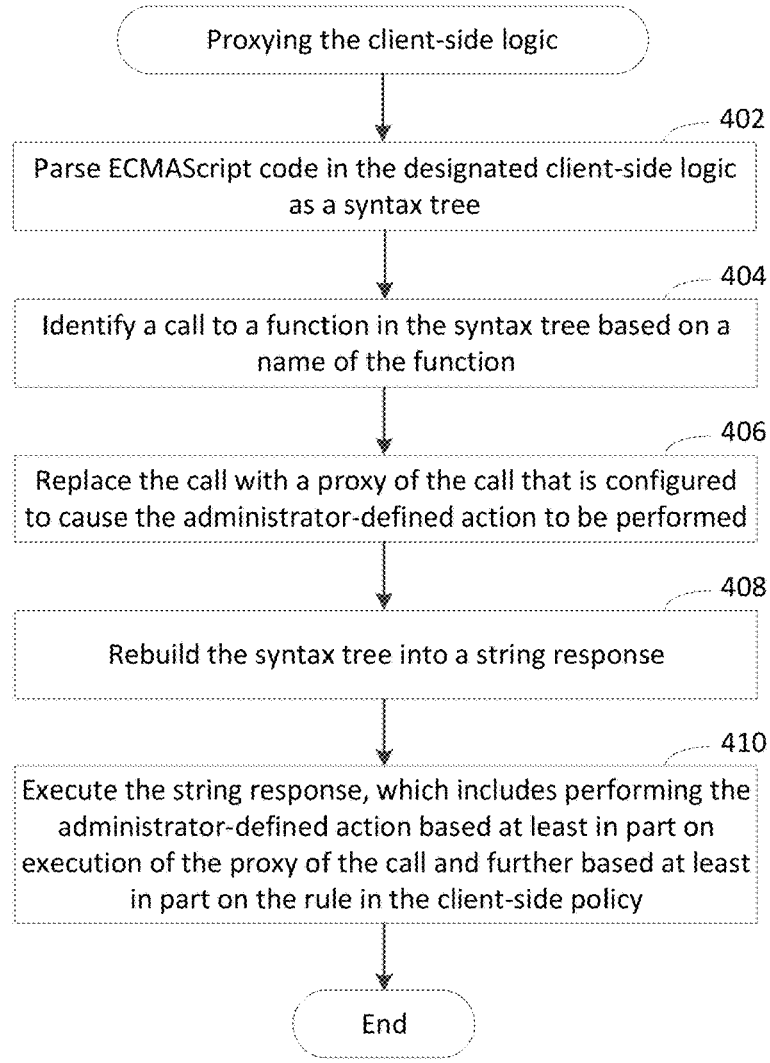

FIG. 4 depicts a flowchart of an example method for proxying client-side logic in accordance with an embodiment.

Figure 6:
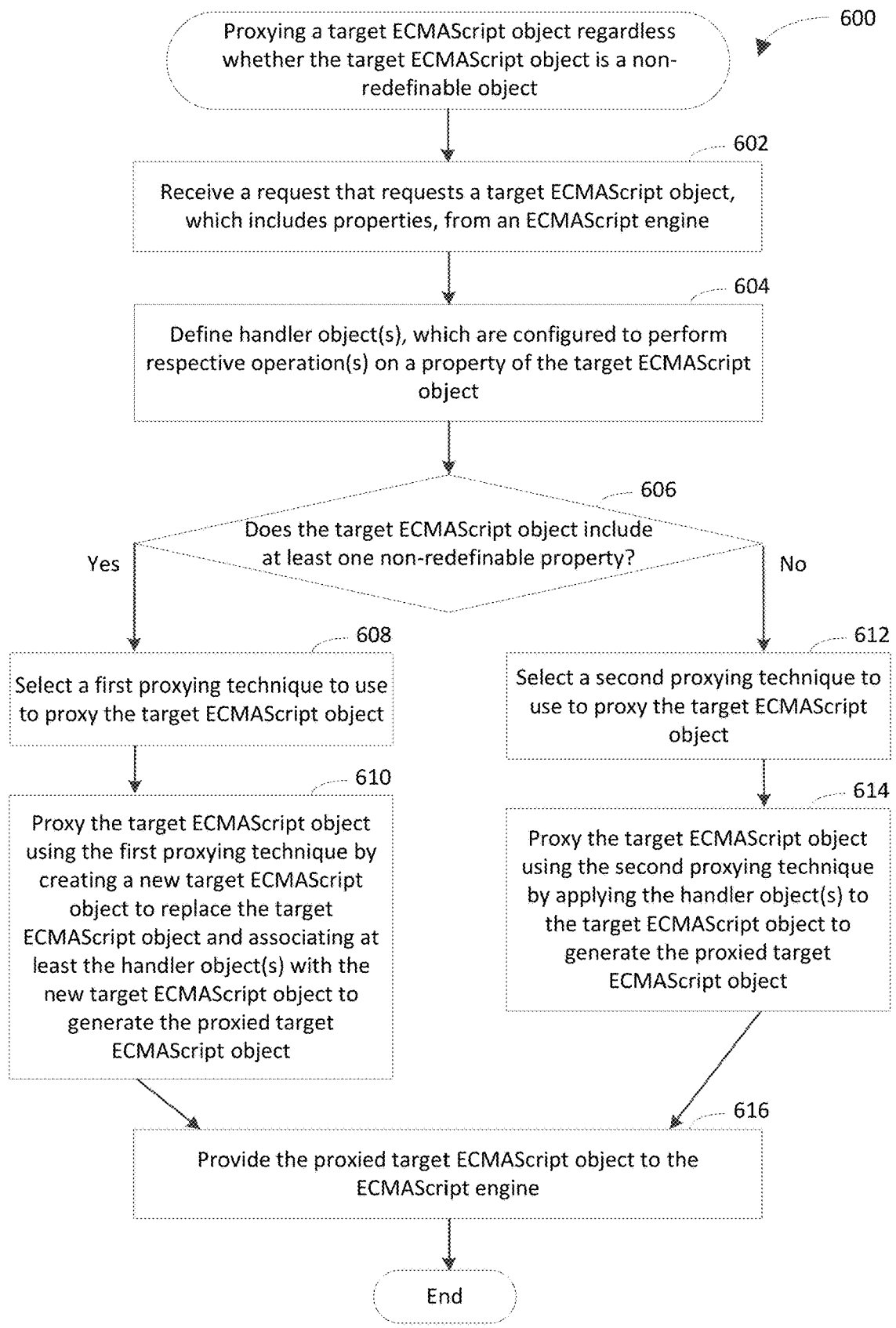

FIG. 6 depicts a flowchart of an example method for proxying a target ECMAScript object regardless whether the target ECMAScript object is a non-redefinable object in accordance with an embodiment.

Figure 7:
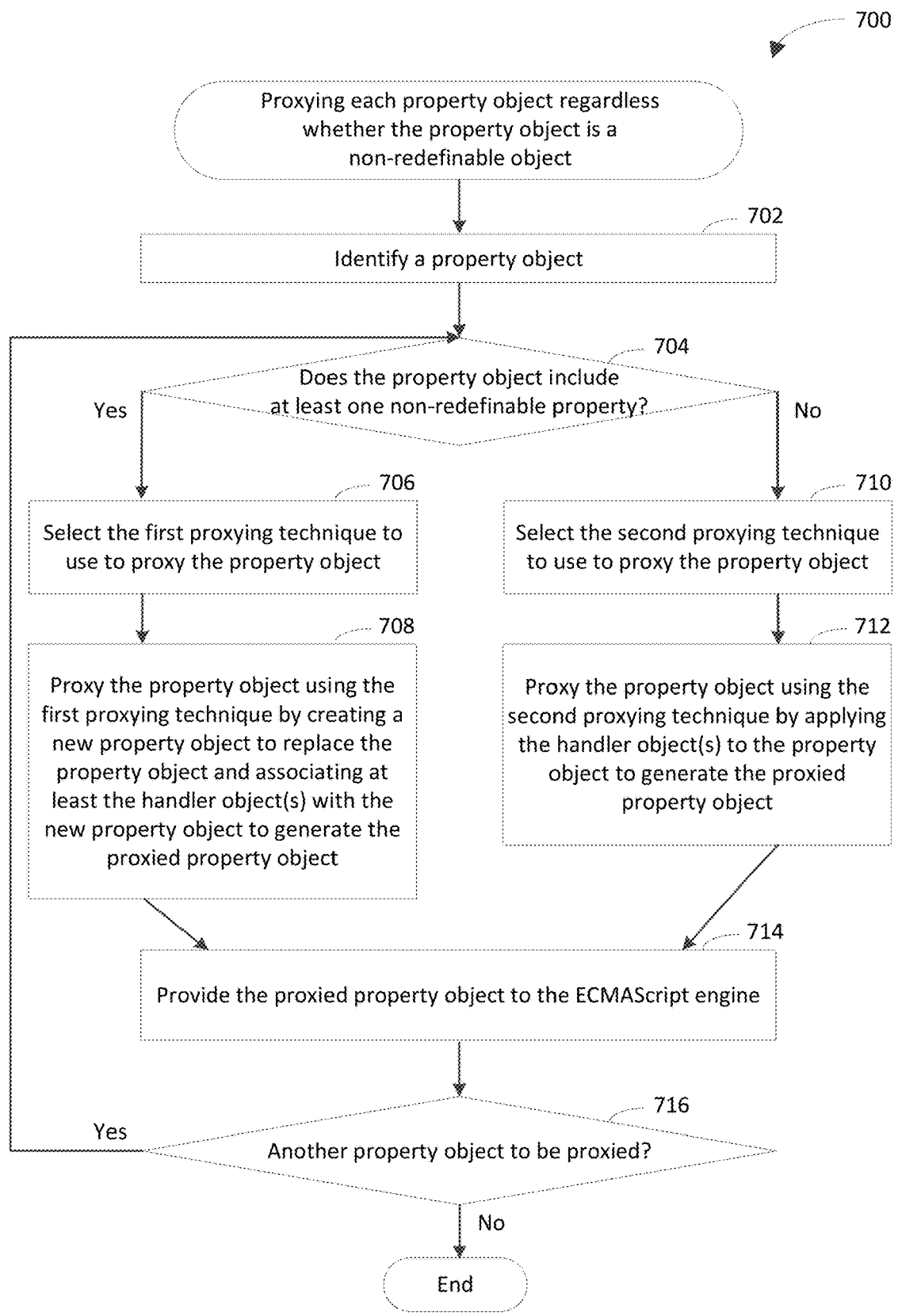

FIG. 7 depicts a flowchart of an example method for proxying each property object regardless whether the property object is a non-redefinable object in accordance with an embodiment.

Figure 9:
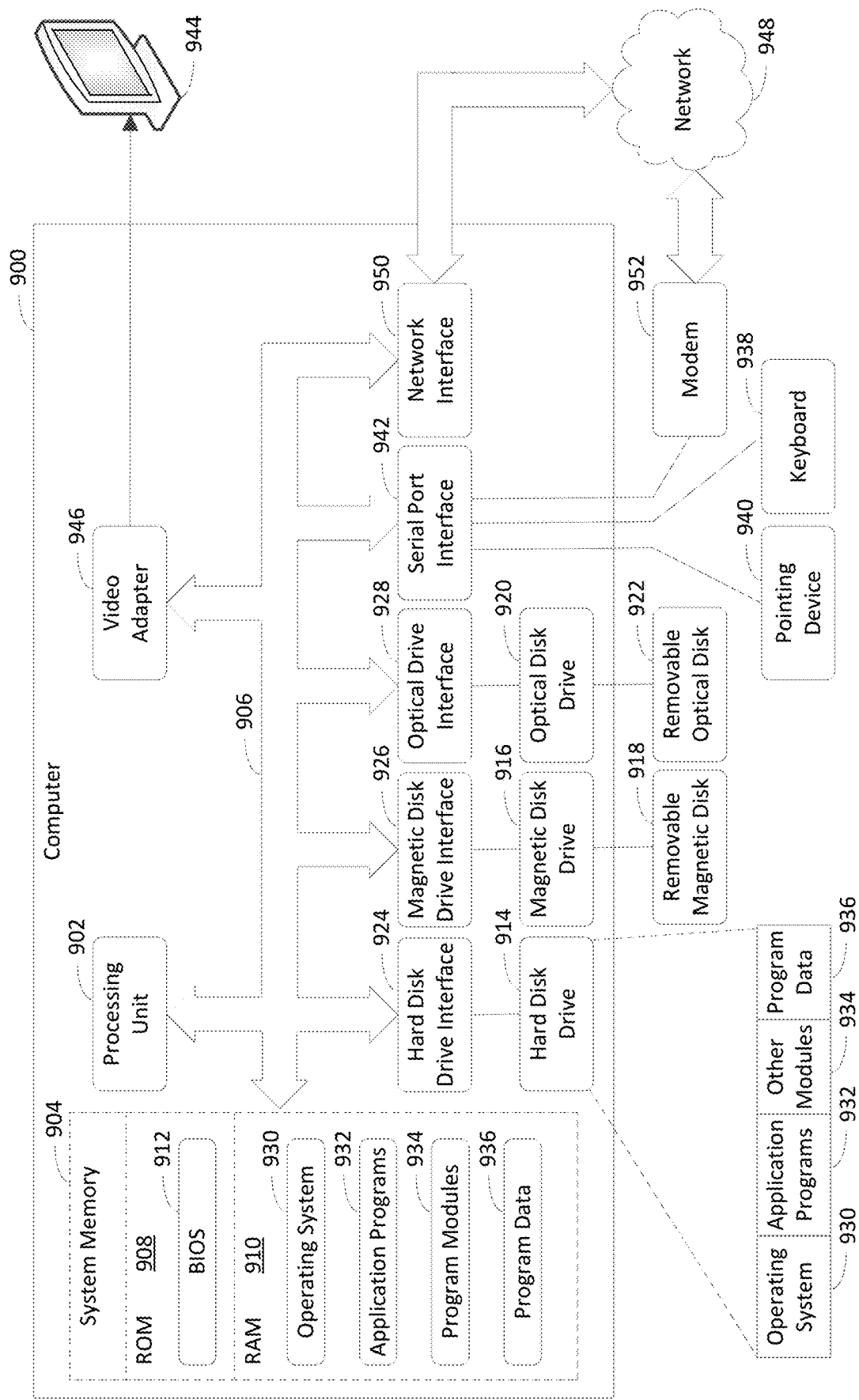

FIG. 9 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of implementing a client-side policy on client-side logic. A client-side policy provides rules to be applied to client-side logic. For instance, the rules may indicate (e.g., specify) actions that are to be performed with regard to (e.g., on) client-side logic that has one or more specified attributes. Examples of an attribute include but are not limited to a name, an association with a user or a group of users, and a functionality. Client-side logic is logic that is configured to be executed by a browser (e.g., web browser); whereas, server-side logic is logic that is configured to be executed by a web server. Examples of client-side logic include but are not limited to an ECMAScript object (e.g., an ECMAScript function), a Hypertext Markup Language (HTML) tag or heading, and a Cascading Style Sheets (CSS) style sheet declaration block that are configured to be executed by a browser. In accordance with the approaches described herein, the client-side policy is configured to support client-side hooks. A hook is one or more lines of code that are inserted into a web page (e.g., in a script embedded therein) to wrap logic (e.g., an object) therein, to change behavior of the web page, and/or to react in response to (e.g., based on) occurrence of an event. A client-side hook is a hook that is inserted into code of the web page that is to be executed by the browser. One example type of a hook is a wrapper. For instance, hooking client-side logic may include wrapping the client-side logic in a wrapper.

Example techniques described herein have a variety of benefits as compared to conventional techniques for implementing policies to provide rules that are to be applied to logic, such as logic in a web page. For instance, the example techniques may be capable of implementing a client-side policy, meaning that the policy provides rules to be applied to client-side logic. The client-side policy supports client-side hooks, which may be configured to be inserted into code of a web page that is to be executed by a browser. For instance, the hooks may enable an administrator to introduce custom actions (e.g., application-specific custom actions) to be performed when client-side logic is called. Example custom actions include but are not limited to executing the client-side logic, triggering an error (e.g., in lieu of executing the client-side logic), and executing administrator-defined client-side logic in addition to or in lieu of at least some (e.g., all) of the client-side logic that was called. Accordingly, the custom actions may extend beyond generic actions, such as file download, file upload, and clipboard actions.

The example techniques may increase security of a client device on which the browser runs. For example, by enabling an error to be triggered and/or administrator-defined client-side logic to be executed (e.g., in lieu of executing the client-side logic that was called), the example techniques may reduce an amount of risky behavior or a number of policy violations or malicious operations that are experienced by the client device. Moreover, traditional policy systems typically do not support client-side hooks, do not proxy client-side logic, do not perform administrator-defined actions, and are not configured to execute administrator-defined client-side logic. The example techniques may reduce an amount of time and/or resources (e.g., processor, memory, network bandwidth) that are consumed to implement policies. For example, by implementing the policies on the client side (e.g., on the browser), additional steps that traditionally are performed in an effort to implement a policy need not necessarily be performed. In accordance with this example, the logic on which the policy is to be enforced need not necessarily pass through the web server. For instance, the client-side logic on which the client-side policy is enforced may be generated by the browser and may not leave the browser. By reducing the amount of time and/or resources that are consumed to implement policies, the example techniques may increase efficiency of the client device on which the browser runs and/or a proxy server that is configured to proxy at least a portion of one or more resources. The example techniques may increase user efficiency (e.g., by reducing a number of steps and/or an amount of time that a user (e.g., IT administrator) takes in an attempt to implement policies. For instance, performing an administrator-defined action based at least in part on a rule in a client-side policy may reduce (e.g., eliminate) a need for the user to manually perform operations in an attempt to the policy.

Figure 1A:
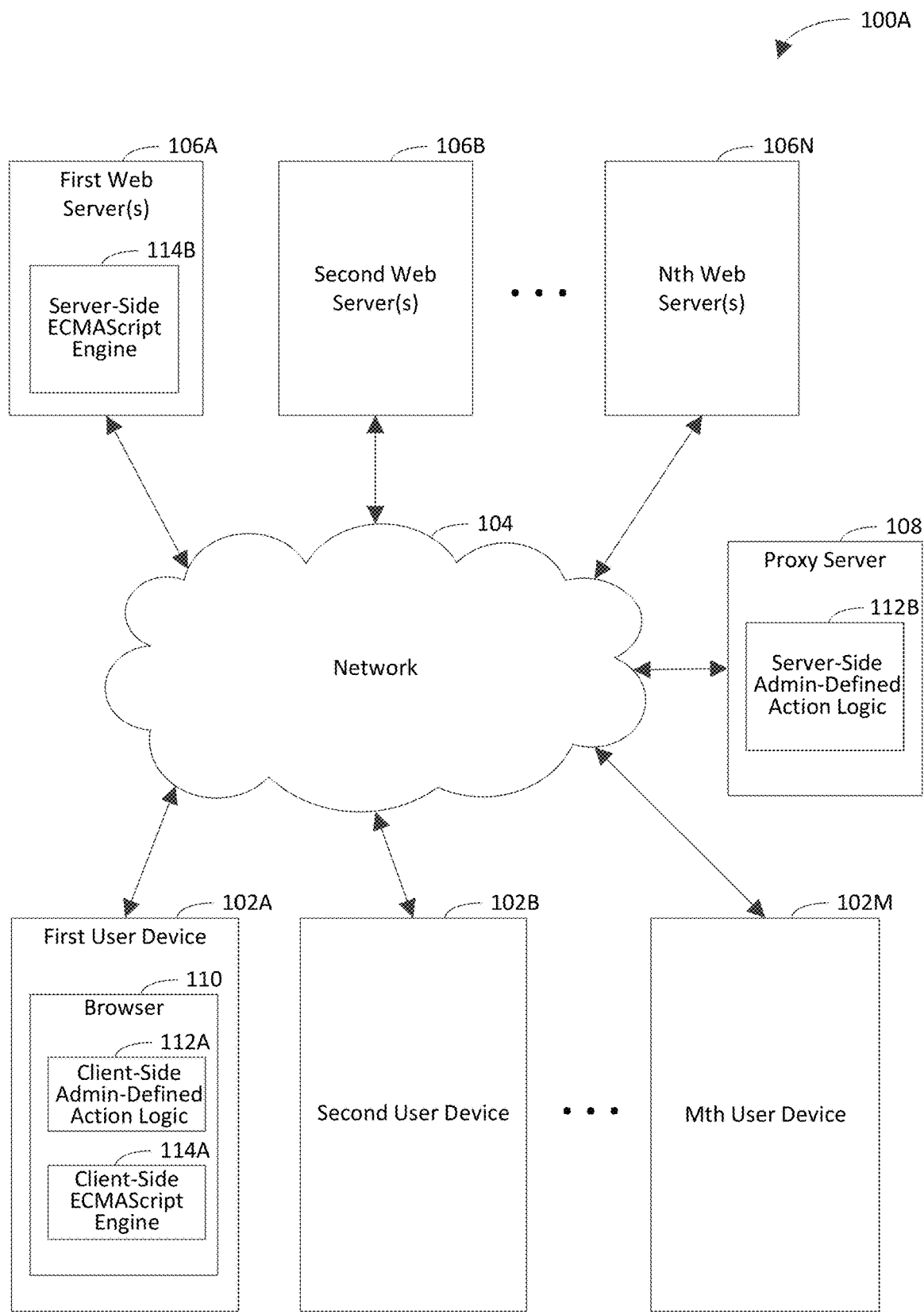
FIG. 1A is a block diagram of an example administrator-defined action system in accordance with an embodiment.

FIG. 1A is a block diagram of an example administrator-defined action system 100A in accordance with an embodiment. Generally speaking, the administrator-defined action system 100A operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the administrator-defined action system 100A implements one or more client-side policies on client-side logic, such as an ECMAScript object (e.g., an ECMAScript function), an HTML tag or heading, or a CSS style sheet declaration block. For instance, the administrator-defined action system 100A may enforce such client-side policies (e.g., rules therein) against the client-side logic.

As shown in FIG. 1A, the administrator-defined action system 100A includes a plurality of user devices 102A-102M, a network 104, a plurality of web servers 106A-106N, and a proxy server 108. Communication among the user devices 102A-102M, the web servers 106A-106N, and the proxy server 108 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the web servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the web servers 106A-106N for requesting information stored on (or otherwise accessible via) the web servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., websites) hosted by the web servers 106A-106N, so that the user devices 102A-102M may access information that is available via the domains. Such domains may include web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more web servers 106A-106N.

The first user device 102A includes a browser 110. The browser 110 is a software application that is configured to enable a user of user device 102A to access resources on the World Wide Web (WWW). For instance, when the user provides a request for a resource, the browser retrieves the resource from one or more of the web servers 106A-106N and provides the resource for display to the user on the user device 102A. For example, the request for the resource may include a uniform resource identifier (URI) that corresponds to a location (e.g., memory location on a web server) at which the resource is hosted. The URI may be a uniform resource locator (URL) or a uniform resource name (URN). Upon receiving the request, the browser 110 may retrieve the resource from a web server that hosts the resource based on the URI. It will be recognized that the resource may be a resources of a webpage (e.g., hypertext markup language (HTML) document).

The browser 110 includes a client-side ECMAScript engine 114A. The client-side ECMAScript engine 114A is a computer program that executes ECMAScript code. For instance, the client-side ECMAScript engine 114A may interpret the ECMAScript code and perform just-in-time compilation of the code. The browser 110 may include other engines, such as a rendering engine. For example, the ECMAScript engine 114A may run in combination with a rendering engine via the Document Object Model (DOM) so that retrieved resources may be transformed into an interactive visual representation on the first user device 102A.

The browser 110 further includes client-side admin-defined action logic 112A. The client-side admin-defined action logic 112A performs operations to facilitate implementation of the one or more client-side policies. For example, the client-side admin-defined action logic 112A may collaborate with the proxy server 108 to implement a client-side policy. In another example, the client-side admin-defined action logic 112A may implement the client-side policy alone (i.e., without assistance from the proxy server 108). Accordingly, the client-side admin-defined action logic 112A performs one or more of a plurality of policy implementation operations to facilitate implementation of the client-side policy. The policy implementation operations include at least (A) configuring the client-side policy to support client-side hooks by configuring a rule in the client-side policy to be applied to client-side logic that is configured to be executed in the browser 110 and (B) performing an administrator-defined action based at least in part on the rule. The rule indicates the administrator-defined action to be performed in response to a request to execute the client-side logic. The administrator-defined action is defined by an information technology (IT) administrator of a system (e.g., enterprise) that includes the user devices 102A-102M. The administrator-defined action is performed in response to receipt of the request. The administrator-defined action may include (1) executing the client-side logic, (2) triggering an error, or (3) executing administrator-defined client-side logic, which is a proxy of the client-side logic and which is defined by the IT administrator.

The browser 110 is shown to be incorporated in the first user device 102A for illustrative purposes and is not intended to be limiting. It will be recognized that the browser 110 may be incorporated in any of the user devices 102A-102M. For instance, each of the user devices 102A-102M may include a respective browser.

The web servers 106A-106N are processing systems that are capable of communicating with the user systems 102A-102M. The web servers 106A-106N are configured to execute computer programs that provide resources to users in response to receiving requests from the users. For example, the resources may include documents (e.g., web pages, images, audio files, video files, etc.), output of executables, or any other suitable type of resources. In accordance with some example embodiments, the web servers 106A-106N are configured to host respective web sites, so that the web sites are accessible to users of the administrator-defined action system 100A.

The first web server(s) 106A include a server-side ECMAScript engine 114B. The server-side ECMAScript engine 114B is a computer program that executes ECMAScript code.

The proxy server 108 is a processing system that serves as an intermediary between the client devices 102A-102M and the web servers 106A-106N to intercept requests initiated by the client devices 102A-102M that request resources from the web servers 106A-106N. The proxy server 108 includes server-side admin-defined action logic 112B, which is capable of analyzing and/or modifying the requested resources before passing on the requested or modified resources to the client device 102A-102M. The server-side admin-defined action logic 112B is capable of performing one or more of the policy implementation operations, which are described above with reference to the client-side admin-defined action logic 112A.

In an example embodiment, the client-side logic does not pass through the proxy server 108. In another example embodiment, the client-side logic is not readable by the proxy server 108.

The client-side admin-defined action logic 112A and/or the server-side admin-defined action logic 112B may be implemented in various ways to implement a client-side policy, including being implemented in hardware, software, firmware, or any combination thereof. For example, the client-side admin-defined action logic 112A and/or the server-side admin-defined action logic 112B may be implemented as computer program code configured to be executed in one or more processors. In another example, the client-side admin-defined action logic 112A and/or the server-side admin-defined action logic 112B may be at least partially implemented as hardware logic/electrical circuitry. For instance, the client-side admin-defined action logic 112A and/or the server-side admin-defined action logic 112B may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The proxy server 108 may be coupled to the user devices 102A-102M, the network 104, and/or the web servers 106A-106N in any suitable arrangement. For instance, the proxy server 108 may be configured as a forward proxy server or a reverse proxy server. Further detail regarding forward proxy servers and reverse proxy servers is provided below with reference to FIGS. 1B and 1C.

Figure 1B:
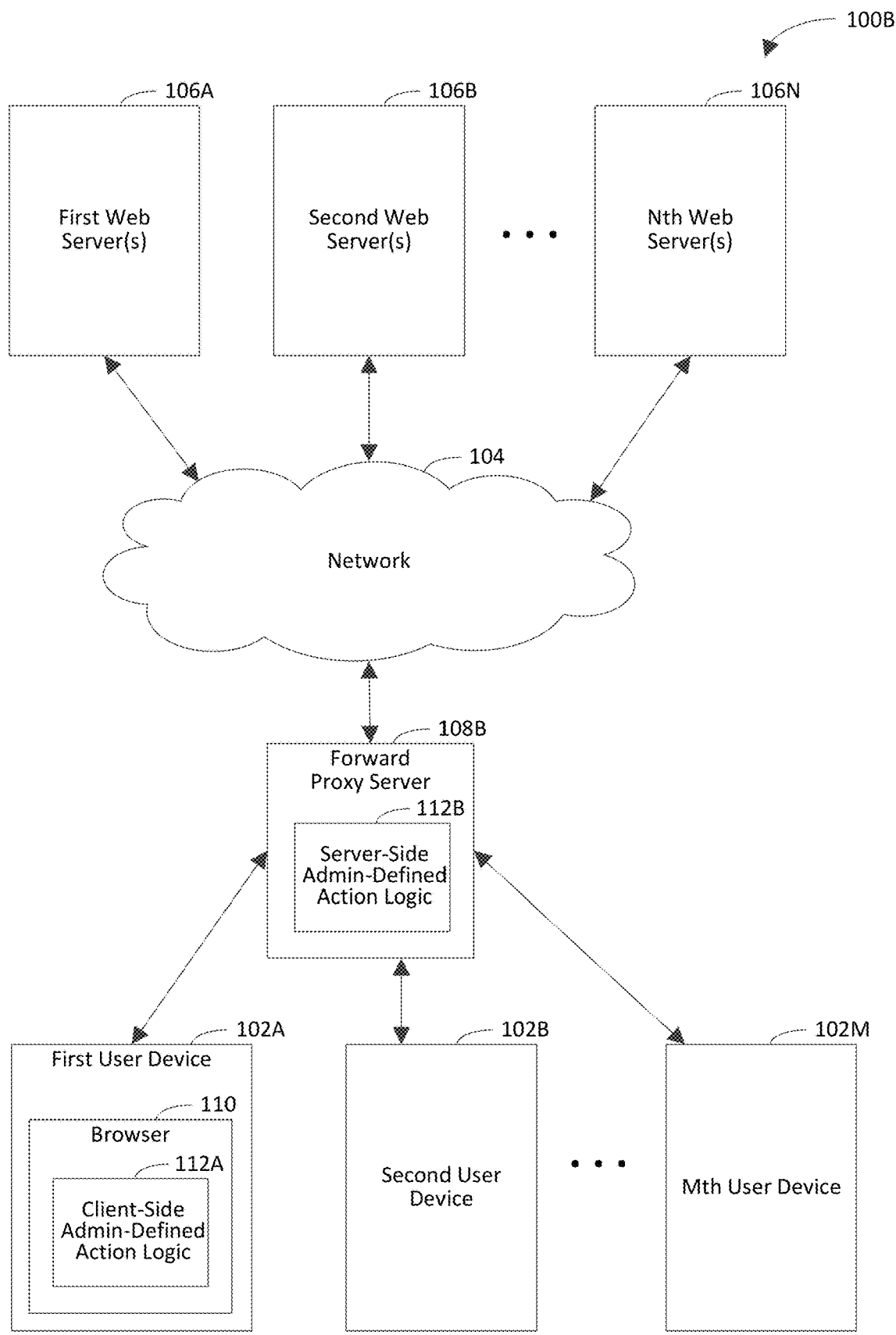
FIG. 1B is a block diagram of an example implementation of the administrator-defined action system shown in FIG. 1A, including a forward proxy server, in accordance with an embodiment.

FIG. 1B is a block diagram of an example administrator-defined action system 100B that includes a forward proxy server 108B in accordance with an embodiment. The administrator-defined action system 100B is an example implementation of the administrator-defined action system 100A shown in FIG. 1A. As shown in FIG. 1B, the administrator-defined action system 100B includes the user devices 102A-102M, the network 104, and the web servers 106A-106N, all of which are operable in the manner described above with respect to FIG. 1A. FIG. 1B differs from FIG. 1A in that the proxy server 108 of FIG. 1A is shown to be implemented as a forward proxy server 108B in FIG. 1B. In the following discussion, an arbitrary user device (e.g., any one of user devices 102A-102M) will be referred to as "user device 102," and an arbitrary web server (e.g., any one of web servers 106A-106N) will be referred to as "web server 106."

The forward proxy server 108B is coupled between the network 104 and the user devices 102A-102M. The forward proxy server 108B generally may act on behalf of a user device 102 to communicate with one or more of the web servers 106A-106N. When the user device 102 is to access a web server 106, the user device 102 may send a request through the forward proxy server 108B (e.g., server-side admin-defined action logic 112B therein) toward the network 104. A user of the user device 102 may configure the forward proxy server 108B to be coupled between the user device 102 and the network 104. For example, the user may manually input an internet protocol (IP) address of the forward proxy server 108B to force the browser 110 to send each resource request through the forward proxy server 108B. In another example, an organization's IT administrator may configure the forward proxy server 108B within the organization's local network to force all requests initiated through the organization's local network to be sent through the forward proxy server 108B.

The user device 102 (e.g., the browser 110 or ECMAScript engine therein) may request access to a web page hosted at the web server 106. In the embodiment of FIG. 1B, the request is not sent directly to the web server 106. Rather, the request is sent to the forward proxy server 108B, and the forward proxy server 108B forwards the request to the web server 106. After the web server 106 receives the request from the forward proxy server 108B, the web server 106 sends the requested web page to the forward proxy server 108B. Once the forward proxy server 108B receives the requested web page, the forward proxy server 108B (e.g., server-side admin-defined action logic 112B therein) may determine whether the web page is to be forwarded to the user device 102.

For example, if the forward proxy server 108B is managed by an IT administrator in a work environment of an employer, the employer may set up the forward proxy server 108B to block users from visiting specified sites, e.g., social networks, explicit sites, etc. In another example, the forward proxy server 108B may be used by the IT administrator to monitor activities of users, e.g., employees' activities at work. For instance, the forward proxy server 108B may log the employee's activities and detect potential anomalies. In yet another example, the forward proxy server 108B may be used to unblock a site that is blocked or banned by an internet service provider (ISP) or government. For instance, a government may prohibit users from accessing certain domains, but the users may use the forward proxy server 108B to unblock the domains that are blocked by the government. In still another example, users may use the forward proxy server 108B to mask their IP addresses to enable the users to access one or more of the web servers 106A-106N.

Once the browser 110 receives a requested resource from the forward proxy server 108B, the client-side admin-defined action logic 112A therein may enforce one or more client-side policies with regard to the requested resource in accordance with one or more of the techniques described herein.

Figure 1C:
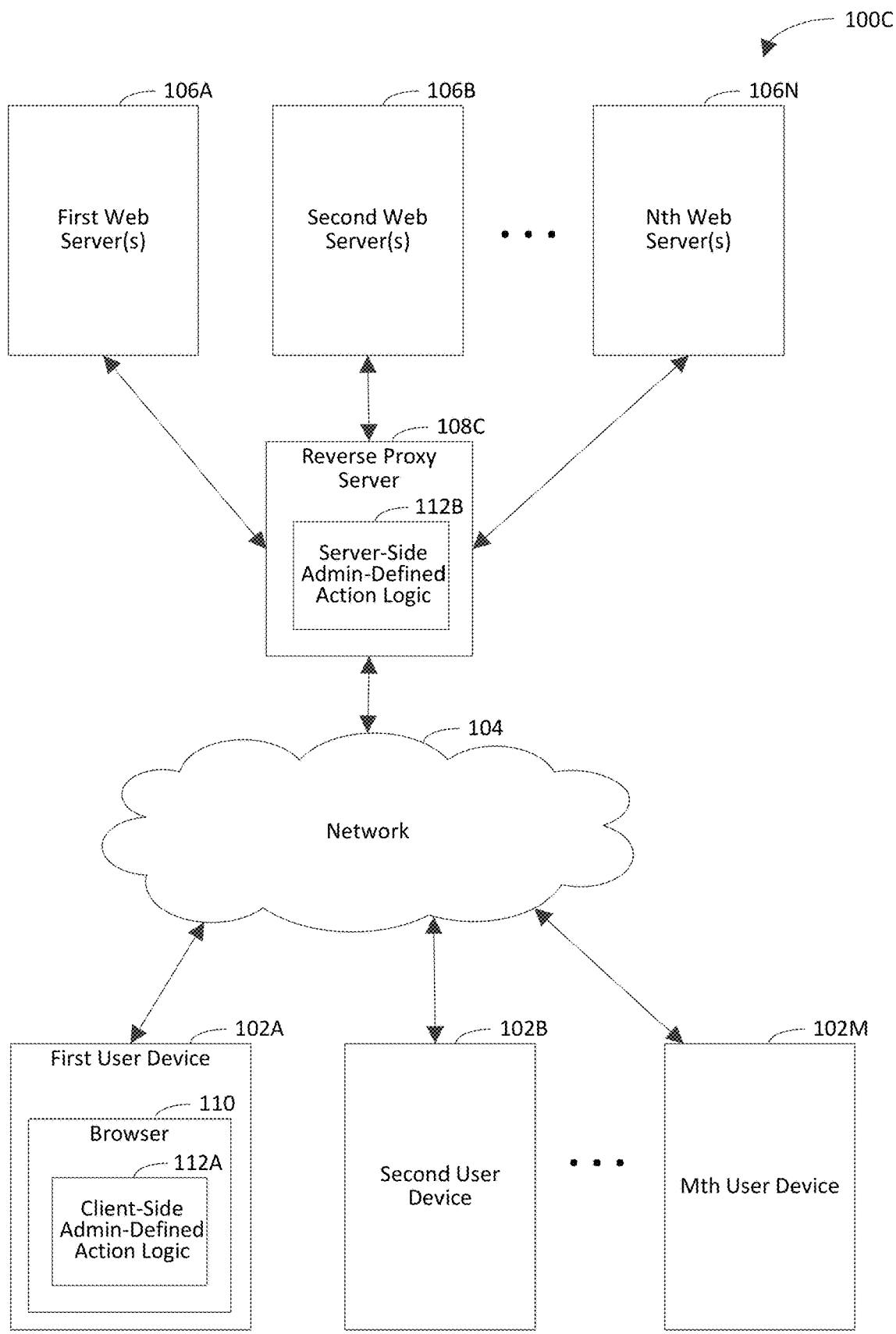
FIG. 1C is a block diagram of another example implementation of the administrator-defined action system shown in FIG. 1A, including a reverse proxy server, in accordance with an embodiment.

FIG. 1C is a block diagram of an example administrator-defined action system 100C that includes a reverse proxy server 108C in accordance with an embodiment. The administrator-defined action system 100C is another example implementation of the administrator-defined action system 100A shown in FIG. 1A. As shown in FIG. 1C, the administrator-defined action system 100C includes the user devices 102A-102M, the network 104, and the web servers 106A-106N, all of which are operable in the manner described above with respect to FIG. 1A. FIG. 1C differs from FIG. 1A in that the proxy server 108 of FIG. 1A is shown to be implemented as a reverse proxy server 108C in FIG. 1C.

The reverse proxy server 108C is coupled between the network 104 and the web servers 106A-106N. The reverse proxy server 108C generally may act on behalf of a web server to communicate with one or more of the user devices 102A-102M. Accordingly, the reverse proxy server 108C may serve as a proxy to a particular web server 106. When each of the clients 102A-102M requests to access the web server 106, the request may be sent to the reverse proxy server 108C (e.g., server-side admin-defined action logic 112B therein), and the reverse proxy server 108C may forward the request to the web server 106.

In an example embodiment, the reverse proxy server 108C need not necessarily forward the request to the web server 106. For instance, the reverse proxy server 108C may act as a security guard that monitors the IP addresses of the user devices from which the requests are received and blocks IP addresses that are listed on a blacklist. The reverse proxy server 108C may be used to achieve various additional functions, including but are not limited to scrubbing traffic, masking the IP address of the web server 106, and improving site speed through a content delivery network (CDN). For example, the CDN may have configured a variety of redundant servers. The reverse proxy server 108C may be configured to forward requests for accessing resources to a redundant server that is the closest to the user device 102. The reverse proxy server 108C may be used to reduce a risk of exposing the web server 106 to intruders. The reverse proxy server 108C may serve as a cache server that caches frequently visited web pages. When a request for a frequently visited web page is received from a user device 102, the reverse proxy server 108C may send a cached web page to the user device 102 without having to access the web server 106. When a cached web page is sent to the user device 102, the reverse proxy server 108C may update the original URL of the web page to the URL of the cached content.

In another example embodiment, the name of the reverse proxy server 108C may be added to the end of the original URL as a suffix. For instance, the original URL of the web page that is requested by the user device 102 may be "abc.com", the URL of the reverse proxy server 108C may be "xyz.com", and the reverse proxy server 108C may cache the web page at a location corresponding to a URL that looks like "abc.com.xyz.com", which adds the name of the reverse proxy server 108C to the end of the original URL. Such a proxy server that returns a URL that adds its own name to the end of the original URL may also be called a "suffix proxy."

In addition to caching the frequently visited web pages, some suffix proxies are capable of modifying a web page and storing the modified web page at a location that corresponds to a suffixed URL. When the browser 110 requests to access the web page, the suffix proxy may redirect the browser 110 to the suffixed URL. In such a case, the browser is caused to access the modified web page, which may appear to be the same as the original web page, but the modified web page may perform different operations or functions or behave differently than the original web page.

Each of the proxy servers 108, 108B, and 108C shown in respective FIGS. 1A-1C may be configured as a reverse suffix proxy server. When a reverse suffix proxy server receives a request for a resource, which includes a URL indicating a location of the resource, the reverse suffix proxy server appends a suffix to the URL, which directs the user to a version of the resource that is protected with policies. For instance, if the user requests to access dropbox.com, the reverse suffix proxy server may append microsoft.com to the URL, resulting in dropbox.com.microsoft.com, enabling the user to access a version of dropbox.com that is protected with policies provided by Microsoft Corporation. By using a reverse suffix proxy server, an organization may control which resources users are allowed to access, control which actions the users are allowed to perform with regard to those resources, and/or monitor the actions that are performed by the users.

The URLs generated by the reverse suffix proxy server are not the original URLs of the applications that the users request to access, and some scripting languages, such as JavaScript®, rely on the URLs. The URLs may be built on the client side (i.e., in the browser), though the example embodiments are not limited in this respect. Accordingly, the reverse suffix proxy server may wrap scripts in a wrapper before providing the scripts to the users. For instance, the reverse suffix proxy server may insert a line of code before and after each script code snippet embedded in a web page.

Once the browser 110 receives a requested resource from the reverse proxy server 108C, the client-side admin-defined action logic 112A therein may enforce one or more client-side policies with regard to the requested resource in accordance with one or more of the techniques described herein.

Figure 2:
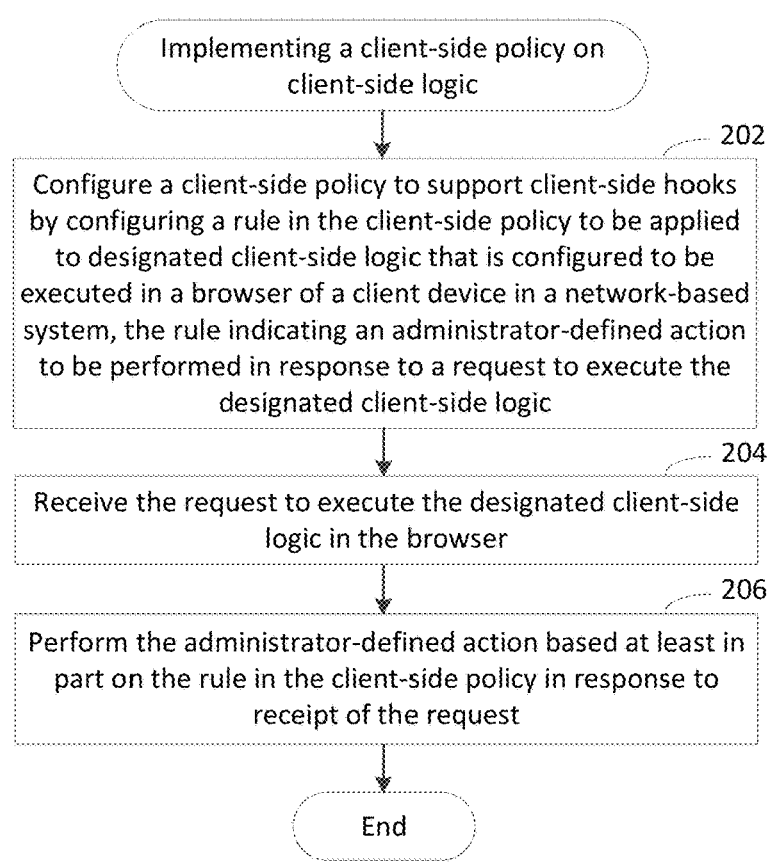
FIG. 2 depicts a flowchart of an example method for implementing a client-side policy on client-side logic in accordance with an embodiment.

FIG. 2 depicts a flowchart 200 of an example method for implementing a client-side policy on client-side logic in accordance with an embodiment. Flowchart 200 may be performed by the client-side admin-defined action logic 112A shown in FIGS. 1A, 1B, and 1C, the server-side admin-defined action logic 112B shown in FIGS. 1A, 1B, and 1C, or a combination thereof, for example. For illustrative purposes, flowchart 200 is described with respect to a computing system 300 shown in FIG. 3. The computing system 300 may be an example implementation of a user device (e.g., first user device 102A), the proxy server 108, or a combination thereof. The computing system 300 includes admin-defined action logic 312, which is an example of client-side admin-defined action logic 112A, server-side admin-defined action logic 112B, or a combination thereof, according to an embodiment. As shown in FIG. 3, the admin-defined action logic 312 includes configuration logic 302 and performance logic 304. Further structural and operational embodiments will be apparent to persons skilled in the relevant art(s) based on the discussion regarding flowchart 200.

As shown in FIG. 2, the method of flowchart 200 begins at step 202. In step 202, a client-side policy is configured to support client-side hooks by configuring a rule in the client-side policy to be applied to designated client-side logic that is configured to be executed in a browser of a client device in a network-based system. The rule indicates (e.g., specifies) an administrator-defined action to be performed in response to a request to execute the designated client-side logic. The administrator-defined action is defined by an administrator of the network-based system. The client-side policy may be an application-specific policy that is specific to a designated application, though the scope of the example embodiments is not limited in this respect. In an example implementation, the configuration logic 302 configures the client-side policy to support client-side hooks by configuring a rule 306 in the client-side policy to be applied to the designated client-side logic. In accordance with this implementation, the rule 306 indicatesg an administrator-defined action (a.k.a. admin-defined action) 310 to be performed in response to an execution request 308 to execute the designated client-side logic. The admin-defined action 310 is defined by the administrator.

At step 204, the request to execute the designated client-side logic in the browser is received. In an example implementation, the performance logic 304 receives the execution request 308.

At step 206, the administrator-defined action is performed based at least in part on the rule in the client-side policy in response to receipt of the request. The administrator-defined action includes (A) executing the designated client-side logic, (B) triggering an error, or (C) executing administrator-defined client-side logic, which is a proxy of the designated client-side logic and which is defined by the administrator of the network-based system. In an example implementation, the performance logic 304 performs the admin-defined action 310 based at least in part on the rule 306 in response to receipt of the execution request 308.

In an example embodiment, the rule indicates that the designated client-side logic is to be executed. In accordance with this example, performing the administrator-defined action at step 206 includes executing the designated client-side logic based at least in part on the rule.

In another example embodiment, the rule indicates that the error is to be triggered. In accordance with this example, performing the administrator-defined action at step 206 includes triggering the error (e.g., throwing an exception).

In yet another example embodiment, the rule indicates that the administrator-defined client-side logic is to be executed. In accordance with this example, performing the administrator-defined action at step 206 includes executing the administrator-defined client-side logic based at least in part on the rule.

In an aspect of this embodiment, executing the administrator-defined client-side logic includes proxying the designated client-side logic by replacing the designated client-side logic with replacement logic.

In another aspect of this embodiment, the designated client-side logic includes an ECMAScript function that is configured to share content. In accordance with this aspect, executing the administrator-defined client-side logic includes proxying the designated client-side logic by blocking sharing of the content. For example, the designated client-side logic may be configured to issue an AJAX request to a server such that the request requests a URI associated with the content (e.g., a file), or the designated client-side logic may be configured to generate the URI without contacting the server. In accordance with this example, the administrator-defined client-side logic may be configured to block the issuance of the AJAX request to the server or to block the generation of the URI (e.g., by the browser). Accordingly, the performance logic 304 may proxy the designated client-side logic by blocking sharing of the content even if no request to share the content was to be issued to a web server.

In yet another aspect of this embodiment, the designated client-side logic includes an AJAX request that includes a message. In accordance with this aspect, executing the administrator-defined client-side logic includes proxying the designated client-side logic by encrypting the message. The message may be a chat message, which is a message generated by a chat application. Examples of a chat application include but are not limited to Microsoft Teams® developed and distributed by Microsoft Corporation, Google Talk® developed and distributed by Google Inc., Slack® developed and distributed by Slack Technologies, Inc., Facebook® Messenger™ developed and distributed by Facebook, Inc., and WhatsApp® developed and distributed by WhatsApp Inc., which is owned by Facebook, Inc.

In still another aspect, the designated client-side logic includes an AJAX request that includes an encrypted message. In accordance with this aspect, executing the administrator-defined client-side logic includes proxying the designated client-side logic by replacing content of the encrypted message with replacement content. For instance, the message may be a chat message. The content may include a title or a body of the chat message. It should be noted that the proxy sever may not be capable of interpreting the message and running policies on the message because the message is end-to-end encrypted. For example, the browser (e.g., admin-defined action logic 312 therein) may encrypt the message before the message is to be sent to the web server. Thus, the browser may have knowledge of the content before encryption. The browser may be able to replace the content of the encrypted message with the replacement content based at least in part on the knowledge of the content before the encryption.

In an example embodiment, configuring the client-side policy at step 202 includes configuring the client-side policy to support client-side hooks by configuring the rule in the client-side policy to be applied to the designated client-side logic based at least in part on the designated client-side logic having a specified name. In accordance with this embodiment, performing the administrator-defined action at step 206 includes performing the administrator-defined action as a result of the designated client-side logic having the specified name. For instance, the specified name may be a name of a function or a name of an element in HTML.

In another example embodiment, receiving the request at step 204 includes receiving the request to execute the designated client-side logic, which includes a target ECMAScript object, from an ECMAScript engine. In accordance with this embodiment, performing the administrator-defined action at step 206 includes wrapping the designated client-side logic in a wrapper by inserting a prepend statement to a beginning of each ECMAScript script and an append statement to an end of the respective ECMAScript script to provide a proxied object tree of the target ECMAScript object.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes issuing an AJAX call from the browser to a proxy server. In an example implementation, the performance logic 304 issues the AJAX call to the proxy server 108. The AJAX call solicits an indication of which action is to be performed in response to the request to execute the designated client-side logic. In accordance with this embodiment, the method of flowchart 200 further includes receiving an instruction at the browser from the proxy server. In an example implementation, the performance logic 304 receives the instruction from the proxy server 108. The instruction indicates the administrator-defined action, which is to be performed in response to the request, based at least in part on the rule. In further accordance with this embodiment, performing the administrator-defined action at step 206 includes performing the administrator-defined action based at least in part on the instruction indicating the administrator-defined action.

In another example embodiment, the method of flowchart 200 further includes reviewing the client-side policy by the browser to determine which action is to be performed in response to the request without contacting the proxy server. For instance, the performance logic 304 may review the client-side policy to determine which action is to be performed in response to the execution request 308. In accordance with this embodiment, performing the administrator-defined action at step 206 includes performing the administrator-defined action based at least in part on a determination by the browser as a result of the review that the administrator-defined action is to be performed.

The designated client-side logic may be proxied in any of a variety of ways. FIG. 4 depicts a flowchart 400 of an example method for proxying client-side logic in accordance with an embodiment. Flowchart 400 may be performed by the client-side admin-defined action logic 112A shown in FIGS. 1A, 1B, and 1C, the server-side admin-defined action logic 112B shown in FIGS. 1A, 1B, and 1C, or a combination thereof, for example. For illustrative purposes, flowchart 400 is described with respect to a computing system 500 shown in FIG. 5. The computing system 500 may be an example implementation of a user device (e.g., first user device 102A), the proxy server 108, or a combination thereof. The computing system 500 includes admin-defined action logic 512, which is an example of client-side admin-defined action logic 112A, server-side admin-defined action logic 112B, or a combination thereof, according to an embodiment. As shown in FIG. 5, the admin-defined action logic 512 includes parsing logic 514, rebuilding logic 516, and performance logic 504. Further structural and operational embodiments will be apparent to persons skilled in the relevant art(s) based on the discussion regarding flowchart 400.

As shown in FIG. 4, the method of flowchart 400 begins at step 402. In step 402, ECMAScript code in the designated client-side logic is parsed into a syntax tree. In an example implementation, the parsing logic 514 parses ECMAScript code 518 in the designated client-side logic into the syntax tree.

At step 404, a call to a function in the syntax tree is identified based on a name of the function. In an example implementation, the parsing logic 514 identifies the call to the function in the syntax tree based on the name of the function. For example, the call to the function may include the name of the function. In accordance with this example, the parsing logic 514 may identify the call to the function by identifying the name of the function in the call.

At step 406, the call is replaced with a proxy of the call that is configured to cause the administrator-defined action to be performed. In an example implementation, the parsing logic 514 replaces the call with the proxy of the call that is configured to cause an admin-defined action 510 to be performed. For instance, the parsing logic 514 may include the proxy of the call in updated ECMAScript code 520 that is sent to the rebuilding logic 516.

At step 408, the syntax tree is rebuilt into a string response (e.g., script). In an example implementation, the rebuilding logic 516 rebuilds the syntax tree into a string response 522. For instance, the rebuilding logic 516 may rebuild the syntax tree into the string response 522 based at least in part on the updated ECMAScript code 520.

At step 410, the string response is executed. Execution of the string response at step 410 includes performing the administrator-defined action based at least in part on execution of the proxy of the call and further based at least in part on the rule in the client-side policy. In an example implementation, the performance logic 504 executes the string response 522. In accordance with this implementation, execution of the string response 522 includes performing the admin-defined action 510 based at least in part on execution of the proxy of the call in the updated ECMAScript code 520 and further based at least in part on a rule 506 in the client-side policy that indicates the admin-defined action 510.

FIG. 6 depicts a flowchart 600 of an example method for proxying a target ECMAScript object regardless whether the target ECMAScript object is a non-redefinable object in accordance with an embodiment. A non-redefinable object is an object that has at least one non-redefinable property. A non-redefinable property is a property that is not capable of being redefined. For example, a property having an attribute of "configurable=false" in JavaScript® constitutes a non-redefinable property. Redefining a property changes a definition of the property and/or a value of the property. For instance, if a non-redefinable object having a non-redefinable property is proxied, a "get" hook in the resulting proxy object must return the same type and value for the property that the non-redefinable object returns. It will be recognized that attempting to redefine a non-redefinable property of a non-redefinable object causes an error to occur with regard to (e.g., during) proxying of the non-redefinable object. For example, such an error may cause an exception to be thrown. One example type of a non-redefinable object is a function object. A function object is an object that defines a function. FIG. 7 depicts a flowchart 700 of an example method for proxying each property object regardless whether the property object is a non-redefinable object in accordance with an embodiment. Flowcharts 600 and 700 may be performed by the client-side admin-defined action logic 112A shown in FIGS. 1A, 1B, and 1C, the server-side admin-defined action logic 112B shown in FIGS. 1A, 1B, and 1C, or a combination thereof, for example. For illustrative purposes, flowcharts 600 and 700 are described with respect to computing system 800 shown in FIG. 8. The computing system 800 may be an example implementation of a user device (e.g., first user device 102A), the proxy server 108, or a combination thereof. The computing system 800 includes admin-defined action logic 812, which is an example of client-side admin-defined action logic 112A, server-side admin-defined action logic 112B, or a combination thereof, according to an embodiment. As shown in FIG. 8, the admin-defined action logic 812 includes defining logic 824, determination logic 826, selection logic 828, and performance logic 804. Further structural and operational embodiments will be apparent to persons skilled in the relevant art(s) based on the discussion regarding flowcharts 600 and 700.

As shown in FIG. 6, the method of flowchart 600 begins at step 602. In step 602, a request that requests a target ECMAScript object is received from an ECMAScript engine. The target ECMAScript object includes properties. For instance, the target ECMAScript object may be a target non-redefinable object. The target non-redefinable object may be a target function object, though the scope of the example embodiments is not limited in this respect. A target ECMAScript object is of type "object". A target function object is of type "function" and is further of type "object". The type "function" takes precedence over the type "object." Thus, a target function object often is referred to as being of type "function" (e.g., without reference to the type "object"). In an example implementation, the defining logic 824 and/or the determination logic 826 receive a request 830 for the target ECMAScript object from the ECMAScript engine.

At step 604, handler object(s), which are configured to perform respective operation(s) on a property of the target ECMAScript object, are defined. In an example implementation, the defining logic 824 defines handler object(s) 836.

In an example embodiment, defining the handler object(s) at step 604 includes binding the handler object(s) to the target ECMAScript object.

At step 606, a determination is made whether the target ECMAScript object includes at least one non-redefinable property. Each property of the target ECMAScript object is non-redefinable if the property is not capable of being redefined (e.g., not capable of being redefined without causing an error to occur with respect to (e.g., during)

proxying of the target ECMAScript object). Each property of the target ECMAScript object is redefinable (i.e., not non-redefinable) if the property is capable of being redefined (e.g., capable of being redefined without causing an error to occur with respect to proxying of the target ECMAScript object). If the target ECMAScript object includes at least one non-redefinable property, flow continues to step 608. Otherwise, flow continued to step 612. In an example implementation, the determination logic 826 determines whether the target ECMAScript object includes at least one non-redefinable property. Determination logic 826 may generate a definability indicator 832 that indicates (e.g., specifies) whether the target ECMAScript object includes at least one non-redefinable property. For example, the definability indicator 832 may have a first value (e.g., a binary "1") based on the target ECMAScript object having at least one non-redefinable property. In another example, the configurability indicator may have a second value (e.g., a binary "0") based on the target ECMAScript object not having at least one non-redefinable property.

In an example embodiment, determining whether the target ECMAScript object includes at least one non-redefinable property at step 606 includes determining whether the target ECMAScript object includes an ECMAScript property having an attribute specifying that the ECMAScript property is not configurable. The ECMAScript property having an attribute specifying that the ECMAScript property is not configurable indicates that the ECMAScript property is non-redefinable. The ECMAScript property not having an attribute specifying that the ECMAScript property is not configurable indicates that the ECMAScript property is redefinable.

At step 608, a first proxying technique is selected to use to proxy the target ECMAScript object. For example, the first proxying technique may be selected from multiple proxying techniques. In accordance with this example, the target ECMAScript object including at least one non-redefinable property may indicate that the first proxying technique is to be selected from the multiple proxying techniques. The first proxy object may be selected at step 608 based at least in part on (e.g., as a result of) the target ECMAScript object including at least one non-redefinable property. In an example implementation, the selection logic 828 selects the first proxying technique. For example, the selection logic 828 may select the first proxying technique based on (e.g., based at least in part on) the target ECMAScript object having at least one non-redefinable property. In accordance with this example, the selection logic 828 may review the definability indicator 832 to determine that the definability indicator 832 indicates that the target ECMAScript object includes at least one non-redefinable property. The definability indicator 832 indicating that the target ECMAScript object includes at least one non-redefinable property may trigger the selection logic 828 to select the first proxying technique. The selection logic 828 may generate a technique indicator 834 to indicate that the first proxying technique has been selected to be used to proxy the target ECMAScript object.

At step 610, the target ECMAScript object is proxied using the first proxying technique by creating a new target ECMAScript object to replace the target ECMAScript object and associating at least the handler object(s) with the new target ECMAScript object to generate the proxied target ECMAScript object. Upon completion of step 610, flow continues to step 616. In an example implementation, the performance logic 804 proxies the target ECMAScript object using the first proxying technique. For instance, the performance logic 804 may proxy the target ECMAScript object using the first proxying technique in response to receipt of the technique indicator (e.g., based on the technique indicator 834 indicating that the first proxying technique has been selected to be used to proxy the target ECMAScript object. In accordance with this implementation, the performance logic 804 proxies the target ECMAScript object using the first proxying technique by creating the new target ECMAScript object to replace the target ECMAScript object and associating at least the handler object(s) 836 with the new target ECMAScript object to generate the proxied target ECMAScript object 838.

At step 612, a second proxying technique is selected to use to proxy the target ECMAScript object. For example, the second proxying technique may be selected from multiple proxying techniques. In accordance with this example, the target ECMAScript object not including at least one non-redefinable property may indicate that the second proxying technique is to be selected from the multiple proxying techniques. The second proxy object may be selected at step 612 based at least in part on (e.g., as a result of) the target ECMAScript object not including at least one non-redefinable property. In an example implementation, the selection logic 828 selects the second proxying technique. For example, the selection logic 828 may select the second proxying technique based on (e.g., based at least in part on) the target ECMAScript object not having at least one non-redefinable property. In accordance with this example, the selection logic 828 may review the definability indicator 832 to determine that the definability indicator 832 indicates that the target ECMAScript object does not include at least one non-redefinable property. The definability indicator 832 indicating that the target ECMAScript object does not include at least one non-redefinable property may trigger the selection logic 828 to select the second proxying technique. The selection logic 828 may generate the technique indicator 834 to indicate that the second proxying technique has been selected to be used to proxy the target ECMAScript object.

At step 614, the target ECMAScript object is proxied using the second proxying technique by applying the handler object(s) to the target ECMAScript object to generate the proxied target ECMAScript object. Upon completion of step 614, flow continues to step 616. In an example implementation, the performance logic 804 proxies the target ECMAScript object using the second proxying technique. For instance, the performance logic 804 may proxy the target ECMAScript object using the second proxying technique in response to receipt of the technique indicator (e.g., based on the technique indicator 834 indicating that the second proxying technique has been selected to be used to proxy the target ECMAScript object. In accordance with this implementation, the performance logic 804 proxies the target ECMAScript object using the second proxying technique by applying the handler object(s) 836 to the target ECMAScript object to generate the proxied target ECMAScript object 838.

At step 616, the proxied target ECMAScript object is provided to the ECMAScript engine. For instance, the proxied target ECMAScript object may be provided to the ECMAScript engine in response to (e.g., based at least in part on) receipt of the request that requests the target ECMAScript object. In an example implementation, the performance logic 804 provides the proxied target ECMAScript object 838 to the ECMAScript engine (e.g., in response to the request 830).

In an example embodiment, defining the handler object(s) at step 604 includes defining a plurality of handler objects, which are configured to perform a plurality of respective operations on a property of the target ECMAScript object. The plurality of handler objects includes the handler object(s). In further accordance with this embodiment, proxying the target ECMAScript object using the first proxying technique at step 610 includes initiating proxying of the target ECMAScript object using the new target ECMAScript object, which initially has no non-redefinable properties, and adding at least a portion of the plurality of handler objects to the new target ECMAScript object to generate the proxied target ECMAScript object using the first proxying technique, based at least in part on the target ECMAScript object including at least one non-redefinable property.

In an aspect of this embodiment, proxying the target ECMAScript object using the first proxying technique at step 610 includes initiating proxying of the target ECMAScript object using the new target ECMAScript object, which initially has no properties, and adding the plurality of handler objects to the new target ECMAScript object to generate the proxied target ECMAScript object using the first proxying technique, based at least in part on the target ECMAScript object including at least one non-redefinable property. For instance, hooks may be called on the target ECMAScript object rather than the new target ECMAScript object. It may be said that the proxy of the target ECMAScript object is initialized on the new target ECMAScript object.

In another aspect of this embodiment, proxying the target ECMAScript object using the first proxying technique at step 610 includes creating the new target ECMAScript object based on (e.g., with) a null prototype. The null prototype may be used as an argument of object.create to create the new target ECMAScript object.

In another example embodiment, the target ECMAScript object is a target function object, and the new target ECMAScript object is a new target function object. In accordance with this embodiment, defining the handler object(s) at step 604 includes defining a plurality of handler objects, which are configured to perform a plurality of respective operations on a property of the target function object. The plurality of handler objects includes the handler object(s). In further accordance with this embodiment, proxying the target ECMAScript object using the first proxying technique at step 610 includes initiating proxying of the target function object using the new target function object, which initially has one or more function properties, applying the handler object(s) to the one or more function properties, and adding the plurality of handler objects to the new target function object to generate the proxied target ECMAScript object using the first proxying technique, based at least in part on the target function object including at least one non-redefinable property. For instance, applying the handler object(s) to the one or more function properties may include over-writing pre-defined (e.g., default) properties of the new target function object to be respective proxies of the respective pre-defined properties.

In some example embodiments, one or more steps 602, 604, 606, 608, 610, 612, 614, and/or 616 of flowchart 600 may not be performed. Moreover, steps in addition to or in lieu of steps 602, 604, 606, 608, 610, 612, 614, and/or 616 may be performed. For instance, in an example embodiment, the method of flowchart 600 includes wrapping the target ECMAScript object by inserting a prepend statement to a beginning of each ECMAScript script of the target ECMAScript object and an append statement to an end of the respective ECMAScript script to provide a proxied object tree of the target ECMAScript object. Each of the prepend statement and the append statement may be a line of code. A wrapper is one example type of a "hook." Accordingly, wrapping an object in a wrapper may be referred to in a broader sense herein as "hooking" the object or an action that is performed as a result of executing the object.

In another example embodiment, a hierarchical object structure includes multiple hierarchical levels. The hierarchical levels including a top level and one or more sub-levels that are below the top level. The target ECMAScript object is a root of the hierarchical object structure in the top level. An object that defines a property is referred to as a property object. Each property of an object is represented by a property object in a sub-level immediately below the hierarchical level that includes the respective object. In accordance with this embodiment, the method of flowchart 600 includes one or more of the steps shown in flowchart 700 of FIG. 7. As shown in FIG. 7, the method of flowchart 700 begins at step 702. In step 702, a property object is identified. In an example implementation, determination logic 826 identifies the property object.

At step 704, a determination is made whether the property object includes at least one non-redefinable property. Each property of the property object is non-redefinable if the property is not capable of being redefined (e.g., not capable of being redefined without causing an error to occur with respect to (e.g., during) proxying of the property object). Each property of the property object is redefinable (i.e., not non-redefinable) if the property is capable of being redefined (e.g., capable of being redefined without causing an error to occur with respect to proxying of the property object). If the property object includes at least one non-redefinable property, flow continues to step 706. Otherwise, flow continued to step 710. In an example implementation, the determination logic 826 determines whether the property object includes at least one non-redefinable property. Determination logic 826 may generate the definability indicator 832 to indicate whether the property object includes at least one non-redefinable property. For example, the definability indicator 832 may have a first value based on the property object having at least one non-redefinable property. In another example, the configurability indicator may have a second value based on the property object not having at least one non-redefinable property.

At step 706, a first proxying technique is selected to use to proxy the property object (e.g., based at least in part on the property object including at least one non-redefinable property. In an example implementation, the selection logic 828 selects the first proxying technique. In accordance with this implementation, the selection logic 828 may review the definability indicator 832 to determine that the definability indicator 832 indicates that the property object includes at least one non-redefinable property. The selection logic 828 may select the first proxying technique based at least in part on the definability indicator 832 indicating that the property object includes at least one non-redefinable property.

At step 708, the property object is proxied using the first proxying technique by creating a new property object to replace the property object and associating at least the handler object(s) with the new property object to generate the proxied property object. Upon completion of step 708, flow continues to step 714. In an example implementation, the performance logic 804 proxies the property object using the first proxying technique. For instance, the performance logic 804 may proxy the property object using the first proxying technique in response to receipt of the technique indicator (e.g., based on the technique indicator 834 indicating that the first proxying technique has been selected to be used to proxy the property object). In accordance with this implementation, the performance logic 804 proxies the property object using the first proxying technique by creating the new property object to replace the property object and associating at least the handler object(s) 836 with the new property object to generate the proxied property object.

At step 710, a second proxying technique is selected to use to proxy the property object (e.g., based at least in part on the property object not including at least one non-redefinable property). In an example implementation, the selection logic 828 selects the second proxying technique. In accordance with this implementation, the selection logic 828 may review the definability indicator 832 to determine that the definability indicator 832 indicates that the property object does not include at least one non-redefinable property. The selection logic 828 may select the second proxying technique based at least in part on the definability indicator 832 indicating that the property object does not include at least one non-redefinable property.

At step 712, the property object is proxied using the second proxying technique by applying the handler object(s) to the property object to generate the proxied property object. Upon completion of step 712, flow continues to step 714. In an example implementation, the performance logic 804 proxies the property object using the second proxying technique. For instance, the performance logic 804 may proxy the property object using the second proxying technique in response to receipt of the technique indicator (e.g., based on the technique indicator 834 indicating that the second proxying technique has been selected to be used to proxy the property object). In accordance with this implementation, the performance logic 804 proxies the property object using the second proxying technique by applying the handler object(s) 836 to the property object to generate the proxied property object.

At step 714, the proxied property object is provided to the ECMAScript engine. In an example implementation, the performance logic 804 provides the proxied property object to the ECMAScript engine.

At step 716, a determination is made whether another property object is to be proxied. If another property object is to be proxied, flow returns to step 704. Otherwise, flowchart 700 ends. In an example implementation, the determination logic 826 determines whether another property object is to be proxied.

It will be recognized that the computing system 800 may not include one or more of defining logic 824, determination logic 826, selection logic 828, performance logic 804, and/or admin-defined action logic 812. Furthermore, the computing system 800 may include components in addition to or in lieu of defining logic 824, determination logic 826, selection logic 828, performance logic 804, and/or admin-defined action logic 812.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of browser 110, client-side admin-defined action logic 112A, server-side admin-defined action logic 112B, client-side ECMAScript engine 114A, server-side ECMAScript engine 114B, configuration logic 302, performance logic 304, admin-defined action logic 312, parsing logic 514, rebuilding logic 516, performance logic 504, admin-defined action logic 512, defining logic 824, determination logic 826, selection logic 828, performance logic 804, admin-defined action logic 812, flowchart 200, flowchart 400, flowchart 600, and/or flowchart 700 may be implemented in hardware, software, firmware, or any combination thereof.

For example, any one or more of browser 110, client-side admin-defined action logic 112A, server-side admin-defined action logic 112B, client-side ECMAScript engine 114A, server-side ECMAScript engine 114B, configuration logic 302, performance logic 304, admin-defined action logic 312, parsing logic 514, rebuilding logic 516, performance logic 504, admin-defined action logic 512, defining logic 824, determination logic 826, selection logic 828, performance logic 804, admin-defined action logic 812, flowchart 200, flowchart 400, flowchart 600, and/or flowchart 700 may be implemented, at least in part, as computer program code configured to be executed in one or more processors.

In another example, any one or more of browser 110, client-side admin-defined action logic 112A, server-side admin-defined action logic 112B, client-side ECMAScript engine 114A, server-side ECMAScript engine 114B, configuration logic 302, performance logic 304, admin-defined action logic 312, parsing logic 514, rebuilding logic 516, performance logic 504, admin-defined action logic 512, defining logic 824, determination logic 826, selection logic 828, performance logic 804, admin-defined action logic 812, flowchart 200, flowchart 400, flowchart 600, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to implement a client-side policy on client-side logic comprises memory and one or more processors coupled to the memory. The one or more processors are configured to configure a client-side policy to support client-side hooks by configuring a rule in the client-side policy to be applied to designated client-side logic that is configured to be executed in a browser of a client device in a network-based system. The rule indicates an administrator-defined action to be performed in response to a request to execute the designated client-side logic. The administrator-defined action is defined by an administrator of the network-based system. The one or more processors are further configured to perform the administrator-defined action based at least in part on the rule in the client-side policy in response to receipt of a request to execute the designated client-side logic in the browser. The administrator-defined action includes: execute the designated client-side logic; trigger an error; or execute administrator-defined client-side logic, which is a proxy of the designated client-side logic and which is defined by the administrator of the network-based system.

In a first aspect of the example system, the one or more processors are configured to issue an AJAX call from the browser to a proxy server. The AJAX call solicits an indication of which action is to be performed in response to the request to execute the designated client-side logic. In accordance with the first aspect, the one or more processors are configured to receive an instruction at the browser from the proxy server. The instruction indicates the administrator-defined action, which is to be performed in response to the request, based at least in part on the rule. In further accordance with the first aspect, the one or more processors are configured to perform the administrator-defined action based at least in part on the instruction indicating the administrator-defined action.

In a second aspect of the example system, the one or more processors are configured to configure the client-side policy to support client-side hooks by configuring the rule in the client-side policy to be applied to the designated client-side logic based at least in part on the designated client-side logic having a specified name. In accordance with the second aspect, the one or more processors are configured to perform the administrator-defined action as a result of the designated client-side logic having the specified name. The second aspect of the example system may be implemented in combination with the first aspect of the example system, though the example embodiments are not limited in this respect.

In a third aspect of the example system, the rule indicates that the administrator-defined client-side logic is to be executed. In accordance with the third aspect, the one or more processors are configured to execute the administrator-defined client-side logic based at least in part on the rule. The third aspect of the example system may be implemented in combination with the first and/or second aspect of the example system, though the example embodiments are not limited in this respect.

In an implementation of the third aspect of the example system, the one or more processors are configured to proxy the designated client-side logic by replacing the designated client-side logic with replacement logic.

In a fourth aspect of the example system, the designated client-side logic includes a target ECMAScript object. In accordance with the fourth aspect, the one or more processors are configured to wrap the designated client-side logic in a wrapper by inserting a prepend statement to a beginning of each ECMAScript script and an append statement to an end of the respective ECMAScript script to provide a proxied object tree of the target ECMAScript object. The fourth aspect of the example system may be implemented in combination with the first, second, and/or third aspect of the example system, though the example embodiments are not limited in this respect.

In a fifth aspect of the example system, the designated client-side logic includes an ECMAScript function that is configured to share content. In accordance with the fifth aspect, the one or more processors are configured to execute the administrator-defined client-side logic, which proxies the designated client-side logic by blocking sharing of the content. The fifth aspect of the example system may be implemented in combination with the first, second, third, and/or fourth aspect of the example system, though the example embodiments are not limited in this respect.

In a sixth aspect of the example system, the designated client-side logic includes an AJAX request that includes a message. In accordance with the sixth aspect, the one or more processors are configured to execute the administrator-defined client-side logic, which proxies the designated client-side logic by encrypting the message. The sixth aspect of the example system may be implemented in combination with the first, second, third, fourth, and/or fifth aspect of the example system, though the example embodiments are not limited in this respect.

In a seventh aspect of the example system, the designated client-side logic includes an AJAX request that includes an encrypted message. In accordance with the seventh aspect, the one or more processors are configured to execute the administrator-defined client-side logic, which proxies the designated client-side logic by replacing content of the encrypted message with replacement content. The seventh aspect of the example system may be implemented in combination with the first, second, third, fourth, fifth, and/or sixth aspect of the example system, though the example embodiments are not limited in this respect.

In an eighth aspect of the example system, the client-side policy is an application-specific policy that is specific to a designated application. The eighth aspect of the example system may be implemented in combination with the first, second, third, fourth, fifth, sixth, and/or seventh aspect of the example system, though the example embodiments are not limited in this respect.

In a ninth aspect of the example system, the designated client-side logic includes a target ECMAScript object. In accordance with the ninth aspect, the one or more processors are configured to execute the administrator-defined client-side logic, which proxies the designated client-side logic by creating a new target ECMAScript object to replace the target ECMAScript object and associating one or more handler objects, which are configured to perform one or more respective operations on a property of the target ECMAScript object, with the new target ECMAScript object to generate a proxied target ECMAScript object. The ninth aspect of the example system may be implemented in combination with the first, second, third, fourth, fifth, sixth, seventh, and/or eighth aspect of the example system, though the example embodiments are not limited in this respect.

In a first implementation of the ninth aspect of the example system, the one or more processors are configured to define a plurality of handler objects, which are configured to perform a plurality of respective operations on a property of the target ECMAScript object, the plurality of handler objects including the one or more handler objects. In accordance with the first implementation of the ninth aspect, the one or more processors are configured to execute the administrator-defined client-side logic, which proxies the designated client-side logic by initiating proxying of the target ECMAScript object using the new target ECMAScript object, which initially has no non-reconfigurable properties, and adding at least a portion of the plurality of handler objects to the new target ECMAScript object to generate the proxied target ECMAScript object.

In a first example of the second implementation of the ninth aspect, the one or more processors are configured to execute the administrator-defined client-side logic, which proxies the designated client-side logic by initiating proxying of the target ECMAScript object using the new target ECMAScript object, which initially has no properties, and adding the plurality of handler objects to the new target ECMAScript object to generate the proxied target ECMAScript object.

In a second example of the second implementation of the ninth aspect, the one or more processors are configured to create the new target ECMAScript object based on a null prototype.

In a second implementation of the ninth aspect of the example system, the target ECMAScript object is a target function object, and the new target ECMAScript object is a new target function object. In accordance with the second implementation of the ninth aspect, the one or more processors are configured to define a plurality of handler objects, which are configured to perform a plurality of respective operations on a property of the target function object, the plurality of handler objects including the one or more handler objects. In further accordance with the second implementation of the ninth aspect, the one or more processors are configured to execute the administrator-defined client-side logic, which proxies the designated client-side logic by initiating proxying of the target function object using the new target function object, which initially has one or more function properties, applying the one or more handler objects to the one or more function properties, and adding the plurality of handler objects to the new target function object to generate the proxied target ECMAScript object.

In a third implementation of the ninth aspect of the example system, the one or more processors are further configured to define the one or more handler objects by binding the one or more handler objects to the target ECMAScript object.

In a tenth aspect of the example system, the designated client-side logic includes a target ECMAScript object that is requested by an ECMAScript engine. In accordance with the tenth aspect, the one or more processors are configured to execute the administrator-defined client-side logic, which proxies the designated client-side logic by applying one or more handler objects, which are configured to perform one or more respective operations on a property of the target ECMAScript object, to the target ECMAScript object to generate a proxied target ECMAScript object. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the designated client-side logic includes ECMAScript code that includes a call to a function having a name. In accordance with the ninth aspect, the one or more processors are configured to parse the ECMAScript code as a syntax tree; identify the call to the function in the syntax tree based on the name; replace the call with a proxy of the call that is configured to cause the administrator-defined action to be performed; rebuild the syntax tree into a string response; and execute the string response, which includes performing the administrator-defined action based at least in part on execution of the proxy of the call and further based at least in part on the rule in the client-side policy. The eleventh aspect of the example system may be implemented in combination with the first, second, third, fourth, fifth, sixth, seventh, eighth, and/or tenth aspect of the example system, though the example embodiments are not limited in this respect.

In an example method of implementing a client-side policy on client-side logic, the client-side policy is configured to support client-side hooks by configuring a rule in a client-side policy to be applied to designated client-side logic that is configured to be executed in a browser of a client device in a network-based system. The rule indicates an administrator-defined action to be performed in response to a request to execute the designated client-side logic. The administrator-defined action is defined by an administrator of the network-based system. The request to execute the designated client-side logic in the browser is received. The administrator-defined action is performed based at least in part on the rule in the client-side policy in response to receipt of the request. The administrator-defined action includes executing the designated client-side logic; triggering an error; or executing administrator-defined client-side logic, which is a proxy of the designated client-side logic and which is defined by the administrator of the network-based system.

In a first aspect of the example method, the example method further comprises issuing an AJAX call from the browser to a proxy server. The AJAX call solicits an indication of which action is to be performed in response to the request to execute the designated client-side logic. In accordance with the first aspect, the example method further comprises receiving an instruction at the browser from the proxy server, the instruction indicating the administrator-defined action, which is to be performed in response to the request, based at least in part on the rule. In further accordance with the first aspect, performing the administrator-defined action comprises performing the administrator-defined action based at least in part on the instruction indicating the administrator-defined action.

In a second aspect of the example method, configuring the client-side policy comprises configuring the client-side policy to support client-side hooks by configuring the rule in the client-side policy to be applied to the designated client-side logic based at least in part on the designated client-side logic having a specified name. In accordance with the second aspect, performing the administrator-defined action comprises performing the administrator-defined action as a result of the designated client-side logic having the specified name. The second aspect of the example method may be implemented in combination with the first aspect of the example method, though the example embodiments are not limited in this respect.

In a third aspect of the example method, the rule indicates that the administrator-defined client-side logic is to be executed. In accordance with the third aspect, performing the administrator-defined action comprises executing the administrator-defined client-side logic based at least in part on the rule. The third aspect of the example method may be implemented in combination with the first and/or second aspect of the example method, though the example embodiments are not limited in this respect.

In a first implementation of the third aspect of the example method, executing the administrator-defined client-side logic comprises proxying the designated client-side logic by replacing the designated client-side logic with replacement logic.

In a second implementation of the third aspect of the example method, the designated client-side logic includes an ECMAScript function that is configured to share content. In accordance with the second implementation of the third aspect, executing the administrator-defined client-side logic comprises proxying the designated client-side logic by blocking sharing of the content.

In a third implementation of the third aspect of the example method, the designated client-side logic includes an AJAX request that includes a message. In accordance with the third implementation of the third aspect, executing the administrator-defined client-side logic comprises proxying the designated client-side logic by encrypting the message.

In a fourth implementation of the third aspect of the example method, the designated client-side logic includes an AJAX request that includes an encrypted message. In accordance with the fourth implementation of the third aspect, executing the administrator-defined client-side logic comprises proxying the designated client-side logic by replacing content of the encrypted message with replacement content.

In a fourth aspect of the example method, receiving the request comprises receiving the request to execute the designated client-side logic, which includes a target ECMAScript object, from an ECMAScript engine. In accordance with the fourth aspect, performing the administrator-defined action comprises wrapping the designated client-side logic in a wrapper by inserting a prepend statement to a beginning of each ECMAScript script and an append statement to an end of the respective ECMAScript script to provide a proxied object tree of the target ECMAScript object. The fourth aspect of the example method may be implemented in combination with the first, second, and/or third aspect of the example method, though the example embodiments are not limited in this respect.

In a fifth aspect of the example method, the client-side policy is an application-specific policy that is specific to a designated application. The fifth aspect of the example method may be implemented in combination with the first, second, third, and/or fourth aspect of the example method, though the example embodiments are not limited in this respect.

In a sixth aspect of the example method, receiving the request comprises receiving the request to execute the designated client-side logic, which includes a target ECMAScript object, from an ECMAScript engine. In accordance with the sixth aspect, performing the administrator-defined action comprises executing the administrator-defined client-side logic, which proxies the designated client-side logic by creating a new target ECMAScript object to replace the target ECMAScript object and associating one or more handler objects, which are configured to perform one or more respective operations on a property of the target ECMAScript object, with the new target ECMAScript object to generate a proxied target ECMAScript object. The sixth aspect of the example method may be implemented in combination with the first, second, third, fourth, and/or fifth aspect of the example method, though the example embodiments are not limited in this respect.

In a first implementation of the sixth aspect of the example method, the example method further comprises defining a plurality of handler objects, which are configured to perform a plurality of respective operations on a property of the target ECMAScript object, the plurality of handler objects including the one or more handler objects. In accordance with the first implementation of the sixth aspect, performing the administrator-defined action comprises executing the administrator-defined client-side logic, which proxies the designated client-side logic by initiating proxying of the target ECMAScript object using the new target ECMAScript object, which initially has no non-reconfigurable properties, and adding at least a portion of the plurality of handler objects to the new target ECMAScript object to generate the proxied target ECMAScript object.

In a first example of the first implementation of the sixth aspect, performing the administrator-defined action comprises executing the administrator-defined client-side logic, which proxies the designated client-side logic by initiating proxying of the target ECMAScript object using the new target ECMAScript object, which initially has no properties, and adding the plurality of handler objects to the new target ECMAScript object to generate the proxied target ECMAScript object.

In a second example of the first implementation of the sixth aspect, creating the new target ECMAScript object comprises creating the new target ECMAScript object based on a null prototype.

In a second implementation of the sixth aspect of the example method, the target ECMAScript object is a target function object, and the new target ECMAScript object is a new target function object. In accordance with the second implementation of the sixth aspect, the example method further comprises defining a plurality of handler objects, which are configured to perform a plurality of respective operations on a property of the target function object. The plurality of handler objects includes the one or more handler objects. In further accordance with the second implementation of the sixth aspect, performing the administrator-defined action comprises executing the administrator-defined client-side logic, which proxies the designated client-side logic by initiating proxying of the target function object using the new target function object, which initially has one or more function properties, applying the one or more handler objects to the one or more function properties, and adding the plurality of handler objects to the new target function object to generate the proxied target ECMAScript object.

In a third implementation of the sixth aspect of the example method, the example method further comprises defining the one or more handler objects by binding the one or more handler objects to the target ECMAScript object.

In a seventh aspect of the example method, the designated client-side logic includes a target ECMAScript object that is requested by an ECMAScript engine. In accordance with the seventh aspect, performing the administrator-defined action comprises executing the administrator-defined client-side logic, which proxies the designated client-side logic by applying one or more handler objects, which are configured to perform one or more respective operations on a property of the target ECMAScript object, to the target ECMAScript object to generate a proxied target ECMAScript object. The seventh aspect of the example method may be implemented in combination with the first, second, third, fourth, fifth, and/or sixth aspect of the example method, though the example embodiments are not limited in this respect.

In an eighth aspect of the example method, receiving the request comprises receiving the request to execute the designated client-side logic, which includes ECMAScript code that includes a call to a function having a name, from an ECMAScript engine. In accordance with the eighth aspect, the example method comprises: parsing the ECMAScript code as a syntax tree; identifying the call to the function in the syntax tree based on the name; replacing the call with a proxy of the call that is configured to cause the administrator-defined action to be performed; rebuilding the syntax tree into a string response; and executing the string response, which includes performing the administrator-defined action based at least in part on execution of the proxy of the call and further based at least in part on the rule in the client-side policy. The eighth aspect of the example method may be implemented in combination with the first, second, third, fourth, fifth, and/or seventh aspect of the example method, though the example embodiments are not limited in this respect.

An example computer program product comprises a computer-readable storage medium having instructions recorded thereon for enabling a processor-based system to perform operations to implement a client-side policy on client-side logic. The operations comprise configure a client-side policy to support client-side hooks by configuring a rule in the client-side policy to be applied to designated client-side logic that is configured to be executed in a browser of a client device in a network-based system. The rule indicates an administrator-defined action to be performed in response to a request to execute the designated client-side logic. The administrator-defined action is defined by an administrator of the network-based system. The operations further comprise perform the administrator-defined action based at least in part on the rule in the client-side policy in response to receipt of a request to execute the designated client-side logic in the browser. The administrator-defined action includes: execute the designated client-side logic; trigger an error; or execute administrator-defined client-side logic, which is a proxy of the designated client-side logic and which is defined by the administrator of the network-based system.

IV. Example Computer System

FIG. 9 depicts an example computer 900 in which embodiments may be implemented. Any one or more of user devices 102A-102M and/or any one or more of web servers 106A-106N shown in FIGS. 1A-1C; proxy server 108 shown in FIG. 1A; forward proxy server 108B shown in FIG. 1B; reverse proxy server 108C shown in FIG. 1C; computing system 300 shown in FIG. 3; computing system 500 shown in FIG. 5; and/or computing system 800 shown in FIG. 8 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) browser 110, client-side admin-defined action logic 112A, server-side admin-defined action logic 112B, client-side ECMAScript engine 114A, server-side ECMAScript engine 114B, configuration logic 302, performance logic 304, admin-defined action logic 312, parsing logic 514, rebuilding logic 516, performance logic 504, admin-defined action logic 512, defining logic 824, determination logic 826, selection logic 828, performance logic 804, admin-defined action logic 812, flowchart 200 (including any step of flowchart 200), flowchart 400 (including any step of flowchart 400), flowchart 600 (including any step of flowchart 600), and/or flowchart 700 (including any step of flowchart 700), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to implement a client-side policy on client-side logic, the system comprising:
   memory; and
   one or more processors coupled to the memory, the one or more processors configured to:
      configure a client-side policy to support client-side hooks by configuring a rule in the client-side policy to be applied to designated client-side logic that is configured to be executed in a browser of a client device in a network-based system, the rule indicating an administrator-defined action to be performed in response to a request to execute the designated client-side logic, the administrator-defined action is defined by an administrator of the network-based system; and
      perform the administrator-defined action based at least in part on the rule in the client-side policy in response to receipt of a request to execute the designated client-side logic in the browser, the administrator-defined action including:
         execute the designated client-side logic;
         trigger an error; or
         execute administrator-defined client-side logic, which is a proxy of the designated client-side logic and which is defined by the administrator of the network-based system.

2. The system of claim 1, wherein the one or more processors are configured to:
   issue an AJAX call from the browser to a proxy server, the AJAX call soliciting an indication of which action is to be performed in response to the request to execute the designated client-side logic;
   receive an instruction at the browser from the proxy server, the instruction indicating the administrator-defined action, which is to be performed in response to the request, based at least in part on the rule; and
   perform the administrator-defined action based at least in part on the instruction indicating the administrator-defined action.

3. The system of claim 1, wherein the one or more processors are configured to:
   configure the client-side policy to support client-side hooks by configuring the rule in the client-side policy to be applied to the designated client-side logic based at least in part on the designated client-side logic having a specified name; and
   perform the administrator-defined action as a result of the designated client-side logic having the specified name.

4. The method of claim 1, wherein the rule indicates that the administrator-defined client-side logic is to be executed; and
   wherein the one or more processors are configured to:
      execute the administrator-defined client-side logic based at least in part on the rule.

5. The system of claim 4, wherein the one or more processors are configured to:
   proxy the designated client-side logic by replacing the designated client-side logic with replacement logic.

6. The system of claim 1, wherein the designated client-side logic includes a target ECMAScript object; and
   wherein the one or more processors are configured to:
      wrap the designated client-side logic in a wrapper by inserting a prepend statement to a beginning of each ECMAScript script and an append statement to an end of the respective ECMAScript script to provide a proxied object tree of the target ECMAScript object.

7. The system of claim 1, wherein the designated client-side logic includes an ECMAScript function that is configured to share content; and
   wherein the one or more processors are configured to:
      execute the administrator-defined client-side logic, which proxies the designated client-side logic by blocking sharing of the content.

8. The system of claim 1, wherein the designated client-side logic includes an AJAX request that includes a message; and
   wherein the one or more processors are configured to:
      execute the administrator-defined client-side logic, which proxies the designated client-side logic by encrypting the message.

9. The system of claim 1, wherein the designated client-side logic includes an AJAX request that includes an encrypted message; and
   wherein the one or more processors are configured to:
      execute the administrator-defined client-side logic, which proxies the designated client-side logic by replacing content of the encrypted message with replacement content.

10. The system of claim 1, wherein the client-side policy is an application-specific policy that is specific to a designated application.

11. The system of claim 1, wherein the designated client-side logic includes ECMAScript code that includes a call to a function having a name; and wherein the one or more processors are configured to:
  parse the ECMAScript code into a syntax tree;
  identify the call to the function in the syntax tree based on the name;
  replace the call with a proxy of the call that is configured to cause the administrator-defined action to be performed;
  rebuild the syntax tree into a string response; and
  execute the string response, which includes performing the administrator-defined action based at least in part on execution of the proxy of the call and further based at least in part on the rule in the client-side policy.

12. A method of implementing a client-side policy on client-side logic, the method comprising:
  configuring a client-side policy to support client-side hooks by configuring a rule in the client-side policy to be applied to designated client-side logic that is configured to be executed in a browser of a client device in a network-based system, the rule indicating an administrator-defined action to be performed in response to a request to execute the designated client-side logic, the administrator-defined action is defined by an administrator of the network-based system;
  receiving the request to execute the designated client-side logic in the browser; and
  performing the administrator-defined action based at least in part on the rule in the client-side policy in response to receipt of the request, the administrator-defined action including:
    executing the designated client-side logic;
    triggering an error; or
    executing administrator-defined client-side logic, which is a proxy of the designated client-side logic and which is defined by the administrator of the network-based system.

13. The method of claim 12, further comprising:
  issuing an AJAX call from the browser to a proxy server, the AJAX call soliciting an indication of which action is to be performed in response to the request to execute the designated client-side logic; and
  receiving an instruction at the browser from the proxy server, the instruction indicating the administrator-defined action, which is to be performed in response to the request, based at least in part on the rule;
  wherein performing the administrator-defined action comprises:
    performing the administrator-defined action based at least in part on the instruction indicating the administrator-defined action.

14. The method of claim 12, wherein configuring the client-side policy comprises:
  configuring the client-side policy to support client-side hooks by configuring the rule in the client-side policy to be applied to the designated client-side logic based at least in part on the designated client-side logic having a specified name; and
  wherein performing the administrator-defined action comprises:
    performing the administrator-defined action as a result of the designated client-side logic having the specified name.

15. The method of claim 12, wherein receiving the request comprises:
  receiving the request to execute the designated client-side logic, which includes ECMAScript code that includes a call to a function having a name, from an ECMAScript engine; and
  wherein the method comprises:
    parsing the ECMAScript code into a syntax tree;
    identifying the call to the function in the syntax tree based on the name;
    replacing the call with a proxy of the call that is configured to cause the administrator-defined action to be performed;
    rebuilding the syntax tree into a string response; and
    executing the string response, which includes performing the administrator-defined action based at least in part on execution of the proxy of the call and further based at least in part on the rule in the client-side policy.

16. The method of claim 12, wherein receiving the request comprises:
  receiving the request to execute the designated client-side logic, which includes a target ECMAScript object, from an ECMAScript engine; and
  wherein performing the administrator-defined action comprises:
    executing the administrator-defined client-side logic, which proxies the designated client-side logic by creating a new target ECMAScript object to replace the target ECMAScript object and associating one or more handler objects, which are configured to perform one or more respective operations on a property of the target ECMAScript object, with the new target ECMAScript object to generate a proxied target ECMAScript object.

17. The method of claim 16, further comprising:
  defining a plurality of handler objects, which are configured to perform a plurality of respective operations on a property of the target ECMAScript object, the plurality of handler objects including the one or more handler objects;
  wherein performing the administrator-defined action comprises:
    executing the administrator-defined client-side logic, which proxies the designated client-side logic by initiating proxying of the target ECMAScript object using the new target ECMAScript object, which initially has no non-redefinable properties, and adding at least a portion of the plurality of handler objects to the new target ECMAScript object to generate the proxied target ECMAScript object.

18. The method of claim 17, wherein performing the administrator-defined action comprises:
  executing the administrator-defined client-side logic, which proxies the designated client-side logic by initiating proxying of the target ECMAScript object using the new target ECMAScript object, which initially has no properties, and adding the plurality of handler objects to the new target ECMAScript object to generate the proxied target ECMAScript object.

19. The method of claim 16, wherein the target ECMAScript object is a target function object;
  wherein the new target ECMAScript object is a new target function object;
  wherein method further comprises:
    defining a plurality of handler objects, which are configured to perform a plurality of respective operations on a property of the target function object, the plurality of handler objects including the one or more handler objects; and wherein performing the administrator-defined action comprises:

executing the administrator-defined client-side logic, which proxies the designated client-side logic by initiating proxying of the target function object using the new target function object, which initially has one or more function properties, applying the one or more handler objects to the one or more function properties, and adding the plurality of handler objects to the new target function object to generate the proxied target ECMAScript object.

20. A computer program product comprising a computer-readable storage medium having instructions recorded thereon for enabling a processor-based system to perform operations to implement a client-side policy on client-side logic, the operations comprising:

configure a client-side policy to support client-side hooks by configuring a rule in the client-side policy to be applied to designated client-side logic that is configured to be executed in a browser of a client device in a network-based system, the rule indicating an administrator-defined action to be performed in response to a request to execute the designated client-side logic, the administrator-defined action is defined by an administrator of the network-based system; and perform the administrator-defined action based at least in part on the rule in the client-side policy in response to receipt of a request to execute the designated client-side logic in the browser, the administrator-defined action including:

execute the designated client-side logic;

trigger an error; or execute administrator-defined client-side logic, which is a proxy of the designated client-side logic and which is defined by the administrator of the network-based system.

* * * * *